(12) United States Patent
Wedig et al.

(10) Patent No.: US 11,682,155 B2
(45) Date of Patent: *Jun. 20, 2023

(54) SKELETAL SYSTEMS FOR ANIMATING VIRTUAL AVATARS

(71) Applicant: Magic Leap, Inc., Plantation, FL (US)

(72) Inventors: Geoffrey Wedig, Torrance, CA (US); Sean Michael Comer, Encino, CA (US); James Jonathan Bancroft, Culver City, CA (US)

(73) Assignee: Magic Leap, Inc., Plantation, FL (US)

( * ) Notice: Subject to any disclaimer, the term of this patent is extended or adjusted under 35 U.S.C. 154(b) by 1 day.

This patent is subject to a terminal disclaimer.

(21) Appl. No.: 17/125,822

(22) Filed: Dec. 17, 2020

(65) Prior Publication Data

US 2021/0201551 A1 Jul. 1, 2021

Related U.S. Application Data

(62) Division of application No. 16/417,118, filed on May 20, 2019, now Pat. No. 10,885,692.

(60) Provisional application No. 62/674,908, filed on May 22, 2018.

(51) Int. Cl.
*G06T 13/40* (2011.01)
*G06T 17/20* (2006.01)

(52) U.S. Cl.
CPC .............. *G06T 13/40* (2013.01); *G06T 17/20* (2013.01)

(58) Field of Classification Search
None
See application file for complete search history.

(56) References Cited

U.S. PATENT DOCUMENTS

| | | | |
|---|---|---|---|
| 6,850,221 | B1 | 2/2005 | Tickle |
| 7,184,047 | B1 * | 2/2007 | Crampton ............... G06T 17/00 348/592 |
| 9,081,426 | B2 | 7/2015 | Armstrong |
| 9,215,293 | B2 | 12/2015 | Miller |
| 9,348,143 | B2 | 5/2016 | Gao et al. |
| 9,417,452 | B2 | 8/2016 | Schowengerdt et al. |
| 9,470,906 | B2 | 10/2016 | Kaji et al. |

(Continued)

FOREIGN PATENT DOCUMENTS

| | | |
|---|---|---|
| EP | 2 967 963 | 5/2018 |
| WO | WO 2017/044499 | 3/2017 |
| WO | WO 2019/226554 | 11/2019 |

OTHER PUBLICATIONS

Invitation to Pay Additional Fees for PCT Application No. PCT/US19/33131, dated Jul. 25, 2019.

(Continued)

*Primary Examiner* — Yanna Wu
(74) *Attorney, Agent, or Firm* — Seed IP Law Group LLP

(57) ABSTRACT

Skinning parameters used to animate a virtual avatar can include mesh weights and joint transforms of a skeleton. Systems and methods are provided for determining skinning parameters using an optimization process subject to constraints based on human-understandable or anatomically-motivated relationships among skeletal joints. Input to the optimization process can include a high-order skeleton and the applied constraints can dynamically change during the optimization. The skinning parameters can be used in linear blend skinning (LBS) applications in augmented reality.

21 Claims, 17 Drawing Sheets

(56) References Cited

U.S. PATENT DOCUMENTS

| | | |
|---|---|---|
| 9,547,174 B2 | 1/2017 | Gao et al. |
| 9,671,566 B2 | 6/2017 | Abovitz et al. |
| 9,740,006 B2 | 8/2017 | Gao |
| 9,791,700 B2 | 10/2017 | Schowengerdt et al. |
| 9,851,563 B2 | 12/2017 | Gao et al. |
| 9,857,591 B2 | 1/2018 | Welch et al. |
| 9,874,749 B2 | 1/2018 | Bradski |
| 10,885,692 B2 | 1/2021 | Wedig et al. |
| 2006/0028436 A1 | 2/2006 | Armstrong |
| 2007/0081123 A1 | 4/2007 | Lewis |
| 2012/0127062 A1 | 5/2012 | Bar-Zeev et al. |
| 2012/0162549 A1 | 6/2012 | Gao et al. |
| 2013/0082922 A1 | 4/2013 | Miller |
| 2013/0088497 A1 | 4/2013 | Dilorenzo et al. |
| 2013/0117377 A1 | 5/2013 | Miller |
| 2013/0125027 A1 | 5/2013 | Abovitz |
| 2013/0208234 A1 | 8/2013 | Lewis |
| 2013/0242262 A1 | 9/2013 | Lewis |
| 2014/0035901 A1 | 2/2014 | Chen et al. |
| 2014/0071539 A1 | 3/2014 | Gao |
| 2014/0177023 A1 | 6/2014 | Gao et al. |
| 2014/0218468 A1 | 8/2014 | Gao et al. |
| 2014/0267420 A1 | 9/2014 | Schowengerdt |
| 2014/0306866 A1 | 10/2014 | Miller et al. |
| 2015/0016777 A1 | 1/2015 | Abovitz et al. |
| 2015/0103306 A1 | 4/2015 | Kaji et al. |
| 2015/0178939 A1 | 6/2015 | Bradski et al. |
| 2015/0205126 A1 | 7/2015 | Schowengerdt |
| 2015/0222883 A1 | 8/2015 | Welch |
| 2015/0222884 A1 | 8/2015 | Cheng |
| 2015/0268415 A1 | 9/2015 | Schowengerdt et al. |
| 2015/0302652 A1 | 10/2015 | Miller et al. |
| 2015/0309263 A2 | 10/2015 | Abovitz et al. |
| 2015/0326570 A1 | 11/2015 | Publicover et al. |
| 2015/0346490 A1 | 12/2015 | TeKolste et al. |
| 2015/0346495 A1 | 12/2015 | Welch et al. |
| 2016/0011419 A1 | 1/2016 | Gao |
| 2016/0026253 A1 | 1/2016 | Bradski et al. |
| 2017/0032579 A1* | 2/2017 | Eisemann ............ G06T 17/205 |
| 2017/0249423 A1* | 8/2017 | Wang .................... A61B 6/544 |
| 2019/0362529 A1 | 11/2019 | Wedig et al. |

OTHER PUBLICATIONS

International Search Report and Written Opinion for PCT Application No. PCT/US19/33131, dated Sep. 23, 2019.

ARToolKit: https://web.archive.org/web/20051013062315/http://www.hitl.washington.edu:80/artoolkit/documentation/hardware.htm, archived Oct. 13, 2005.

Azuma, "A Survey of Augmented Reality," Teleoperators and Virtual Environments 6, 4 (Aug. 1997), pp. 355-385. https://web.archive.org/web/20010604100006/http://www.cs.unc.edu/~azuma/ARpresence.pdf.

Azuma, "Predictive Tracking for Augmented Realty." TR95-007, Department of Computer Science, UNC-Chapei Hill, NC, Feb. 1995.

Bimber, et al., "Spatial Augmented Reality—Merging Real and Virtual Worlds," 2005 https://web.media.mit.edu/~raskar/book/BimberRaskarAugmentedRealityBook.pdf.

Jacob, "Eye Tracking in Advanced Interface Design," Human-Computer Interaction Lab Naval Research Laboratory, Washington, D.C. / paper/ in Virtual Environments and Advanced Interface Design, ed. by W. Barfield and T.A. Furness, pp. 258-288, Oxford University Press, New York (1995).

James, et al., "Skinning Mesh Animations," ACM Transactions on Graphics (TOG), vol. 24(3), pp. 399-407, Jul. 2005.

Le, et al., "Robust and Accurate Skeletal Rigging from Mesh Sequences," ACM Transactions on Graphics (TOG), vol. 33(4), pp. 84-93, Jul. 2014.

Le, et al., Smooth Skinning Decomposition with Rigid Bones, ACM Transactions on Graphics (TOG). vol. 31(6), pp. 199-209, Nov. 2012.

Tanriverdi and Jacob, "Interacting With Eye Movements in Virtual Environments," Department of Electrical Engineering and Computer Science, Tufts University, Medford, MA—paper/Proc. ACM CHI 2000 Human Factors in Computing Systems Conference, pp. 265-272, Addison-Wesley/ACM Press (2000).

International Preliminary Report on Patentability for PCT Application No. PCT/US19/33131, dated Nov. 24, 2020.

Loper, et al., "SMPL: A Skinned Multi-Person Linear Model," ACM Transactions on Graphics, vol. 34, No. 6, Article 248, Publication Date: Nov. 2015.

Luo, Zhiping "Interactive Character Deformation Using Simplified Elastic Models," Chapter 5.4, dated Mar. 13, 1986. Retrieved from the Internet: URL:https://dspace.library.uu.nl/bistream/1874/326014/1/Luo.pdf [retrieved on Jan. 4, 2022).

* cited by examiner

SKELETAL SYSTEMS FOR ANIMATING VIRTUAL AVATARS

CROSS-REFERENCE TO RELATED APPLICATIONS

This application is a divisional application of U.S. patent application Ser. No. 16/417,118, filed May 20, 2019, entitled SKELETAL SYSTEMS FOR ANIMATING VIRTUAL AVATARS, which claims the benefit of priority to U.S. Patent Application No. 62/674,908, filed May 22, 2018, entitled SKELETAL SYSTEMS FOR ANIMATING VIRTUAL AVATARS, each of which is hereby incorporated by reference herein in its entirety.

FIELD

The present disclosure relates to virtual reality and augmented reality, including mixed reality, imaging and visualization systems and more particularly to skinning systems and methods for animating virtual characters, such as avatars.

BACKGROUND

Modern computing and display technologies have facilitated the development of systems for so called "virtual reality," "augmented reality," and "mixed reality" experiences, wherein digitally reproduced images are presented to a user in a manner such that they seem to be, or may be perceived as, real. A virtual reality (VR) scenario typically involves presentation of computer-generated virtual image information without transparency to other actual real-world visual input. An augmented reality (AR) scenario typically involves presentation of virtual image information as an augmentation to visualization of the actual world around the user. Mixed reality (MR) is a type of augmented reality in which physical and virtual objects may co-exist and interact in real time. Systems and methods disclosed herein address various challenges related to VR, AR and MR technology.

SUMMARY

Skinning parameters used to animate a virtual avatar can include mesh weights and joint transforms of a skeleton. Systems and methods are provided for determining skinning parameters using an optimization process subject to constraints based on human-understandable or anatomically-motivated relationships among skeletal joints. Input to the optimization process can include a high-order skeleton and the applied constraints can dynamically change during the optimization. The skinning parameters can be used in linear blend skinning (LBS) applications in augmented reality, gaming, movies, or visual effects.

Examples of systems and methods for improving or optimizing mesh (e.g., skin) weights and joint transforms for animation of a virtual avatar are provided. The joint transforms can include multiple (e.g., 6) degrees of freedom. The systems and methods can accept target pose training data from a variety of input sources (e.g., photogrammetric scans, artist-driven sculpting, simulations, or biometrically derived models) and can generate high-fidelity weights and transforms for use in linear blend skinning (LBS). The systems and methods can calculate the weights and joint transforms (e.g., rotations and translations) by solving a constrained optimization problem. The optimization can be constrained to only those solutions that provide high-fidelity, under generalized conditions, including the use of novel or real-time captured animation performances. This can result in reductions in the number of samples (often expensive and time consuming to generate) or the number of joint transforms used to meet quality metrics.

Although certain embodiments of the systems and methods are described in the context of augmented, mixed, or virtual reality, they are not so limited, and can be applied to gaming, movies, or visual effects (VFx).

Details of one or more implementations of the subject matter described in this specification are set forth in the accompanying drawings and the description below. Other features, aspects, and advantages will become apparent from the description, the drawings, and the claims. Neither this summary nor the following detailed description purports to define or limit the scope of the inventive subject matter.

BRIEF DESCRIPTION OF THE DRAWINGS

Details of one or more implementations of the subject matter described in this specification are set forth in the accompanying drawings and the description below. Other features, aspects, and advantages will become apparent from the description, the drawings, and the claims.

Figure 1:
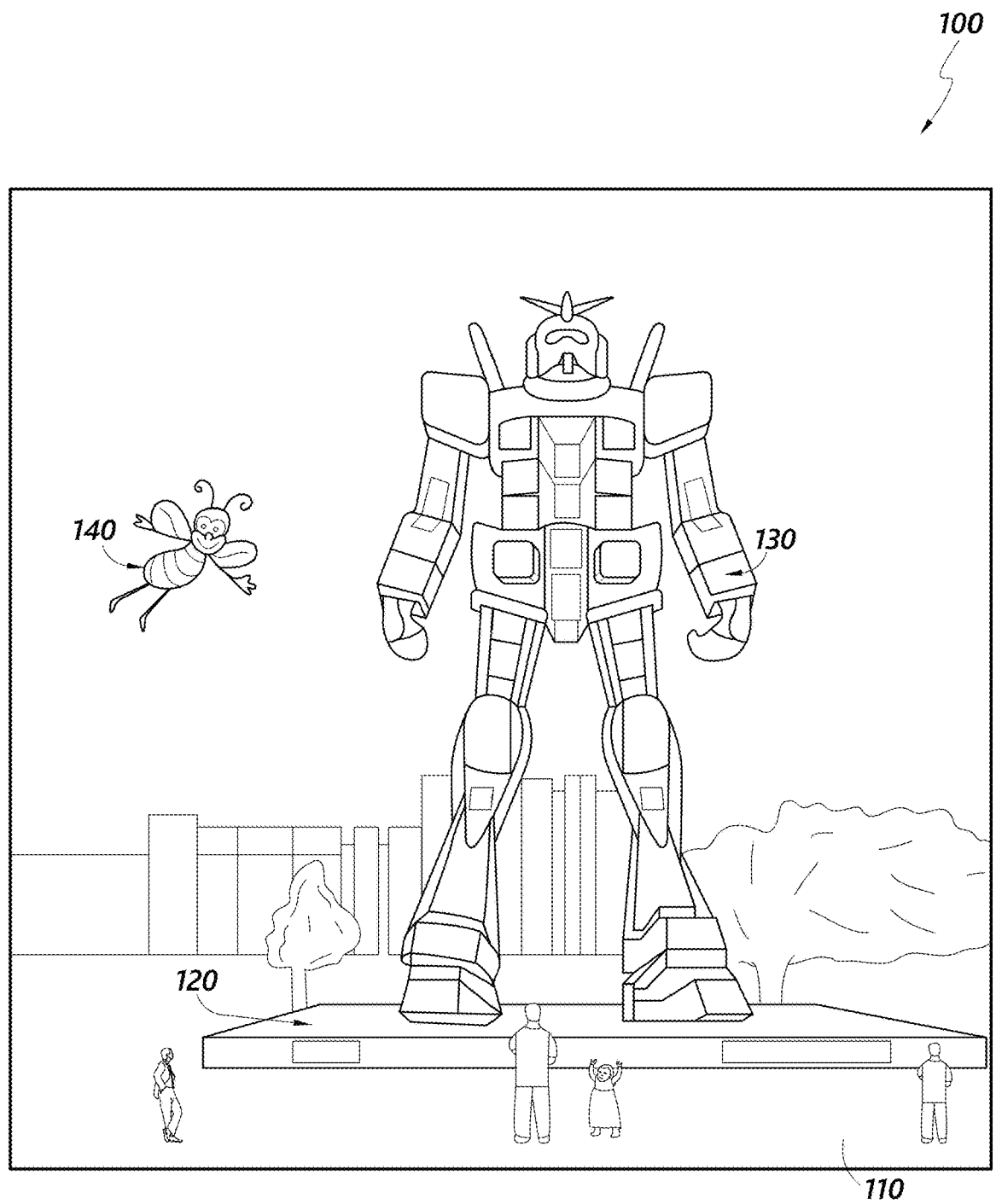
FIG. 1 depicts an illustration of a mixed reality scenario with certain virtual reality objects, and certain physical objects viewed by a person.

Throughout the drawings, reference numbers may be re-used to indicate correspondence between referenced elements. The drawings are provided to illustrate example embodiments described herein and are not intended to limit the scope of the disclosure.

DETAILED DESCRIPTION

Overview

A virtual avatar may be a virtual representation of a real or fictional person (or creature or personified object) in an AR/VR/MR environment. For example, during a telepresence session in which two AR/VR/MR users are interacting with each other, a viewer can perceive an avatar of another user in the viewer's environment and thereby create a tangible sense of the other user's presence in the viewer's environment. The avatar can also provide a way for users to interact with each other and do things together in a shared virtual environment. For example, a student attending an online class can perceive and interact with avatars of other students or the teacher in a virtual classroom. As another example, a user playing a game in an AR/VR/MR environment may view and interact with avatars of other players in the game.

Embodiments of the disclosed systems and methods may provide for improved animation of avatars and a more realistic interaction between a user of the wearable system and avatars in the user's environment. Although the examples in this disclosure generally describe animating a human-shaped avatar, similar techniques can also be applied to animals, fictitious creatures, objects, etc.

A wearable device can include a display for presenting an interactive VR/AR/MR environment that includes a high fidelity digital avatar. Creation of a high fidelity digital avatar can take many weeks or months of work by a specialized team and can utilize a large number of high quality digitized photographic scans of the human model. Embodiments of the disclosed technology have the capability of creating high quality or high fidelity avatars (or digital representations in general) of any human, animal, character, or object. In order to accomplish this, embodiments of the disclosed process are faster and less resource intense while still maintaining an accurate output.

As an example, a digital representation of a human (generally, any animal or deformable object such as clothing or hair) may include a skeleton and an overlying mesh (e.g., to show the outer surface, which may be skin, clothing, etc.). Bones can be connected to other bones at joints, and a bone can have certain mesh vertices assigned to it, such that when the bone moves, the assigned vertices automatically move with the bone. Each vertex can have multiple bone assignments with the vertex's motion interpolated from the combination of bone movements. This initial movement is called a "skin cluster" and generally captures gross movement. (It should be noted that the bones and skeleton are digital constructs and do not necessarily correspond to actual bones in the human body.) A subsequent step in modeling the human (the virtual representation of which is sometimes referred to herein as an avatar) may be needed to capture finer movements of the skin, which is sometimes referred to herein as a surface or mesh. This subsequent step represents differences from the initial gross movement to capture finer movements of the skin.

To animate an avatar, a wearable device can utilize linear blend skinning (LBS) techniques in which vertices of the avatar's mesh are transformed based on a linear, weighted sum of rotations and translations of the joints of the underlying skeleton. Calculating the weights, rotations, and translations of the joints (collectively referred to as skinning parameters) for a series of avatars poses is a challenging problem.

Human animators can assign mesh vertices to bones by setting the corresponding weights of each vertex for each bone. Human animators make these assignments based on the animator's unique, subjective, artistic vision, and there are as many manual skinning techniques as there are animators. This assignment process can be a laborious and time-consuming process that is not well-positioned to create skins for use in real-time applications such as augmented, mixed, or virtual reality.

The present application describes computational systems and methods that can take a target pose from a variety of sources (e.g., photogrammetric scans of a model, artist-driven sculpting, simulations, or biometrically derived models) and calculate the skinning parameters for the pose. The systems and methods can apply constrained optimization techniques that are seeded by initial target poses, a high-order skeleton and skin clusters, to generate the skinning parameters subject to human-understandable and biologically motivated constraints (e.g., lengths between joints may be constrained, because real world bones do not readily change their lengths). The systems and methods may be particularly applicable in a real-time context and may reduce or minimize the need for user (e.g., animator) input. These computational systems and methods are based on specific, objective, unconventional rules that can be algorithmically applied to generate the skinning parameters in a way that is different from how human animators have subjectively performed animation, using the animator's subjective artistic vision.

Accordingly, a variety of implementations of systems and methods for calculating skinning parameters for automated avatar animation will be provided below.

Examples of 3D Display of a Wearable System

A wearable system (also referred to herein as an augmented reality (AR) system) can be configured to present 2D or 3D virtual images to a user. The images may be still images, frames of a video, or a video, in combination or the like. At least a portion of the wearable system can be implemented on a wearable device that can present a VR, AR, or MR environment, alone or in combination, for user interaction. The wearable device can be used interchangeably as an AR device (ARD). Further, for the purpose of the present disclosure, the term "AR" is used interchangeably with the term "MR".

FIG. 1 depicts an illustration of a mixed reality scenario with certain virtual reality objects, and certain physical objects viewed by a person. In FIG. 1, an MR scene 100 is depicted wherein a user of an MR technology sees a real-world park-like setting 110 featuring people, trees, buildings in the background, and a concrete platform 120. In addition to these items, the user of the MR technology also perceives that he "sees" a robot statue 130 standing upon the real-world platform 120, and a cartoon-like avatar character 140 flying by which seems to be a personification of a bumble bee, even though these elements do not exist in the real world.

In order for the 3D display to produce a true sensation of depth, and more specifically, a simulated sensation of surface depth, it may be desirable for each point in the display's visual field to generate an accommodative response corresponding to its virtual depth. If the accommodative response to a display point does not correspond to the virtual depth of that point, as determined by the binocular depth cues of convergence and stereopsis, the human eye may experience an accommodation conflict, resulting in unstable imaging, harmful eye strain, headaches, and, in the absence of accommodation information, almost a complete lack of surface depth.

VR, AR, and MR experiences can be provided by display systems having displays in which images corresponding to a plurality of depth planes are provided to a viewer. The images may be different for each depth plane (e.g., provide slightly different presentations of a scene or object) and may be separately focused by the viewer's eyes, thereby helping to provide the user with depth cues based on the accommodation of the eye required to bring into focus different image features for the scene located on different depth plane or based on observing different image features on different depth planes being out of focus. As discussed elsewhere herein, such depth cues provide credible perceptions of depth.

Figure 2:
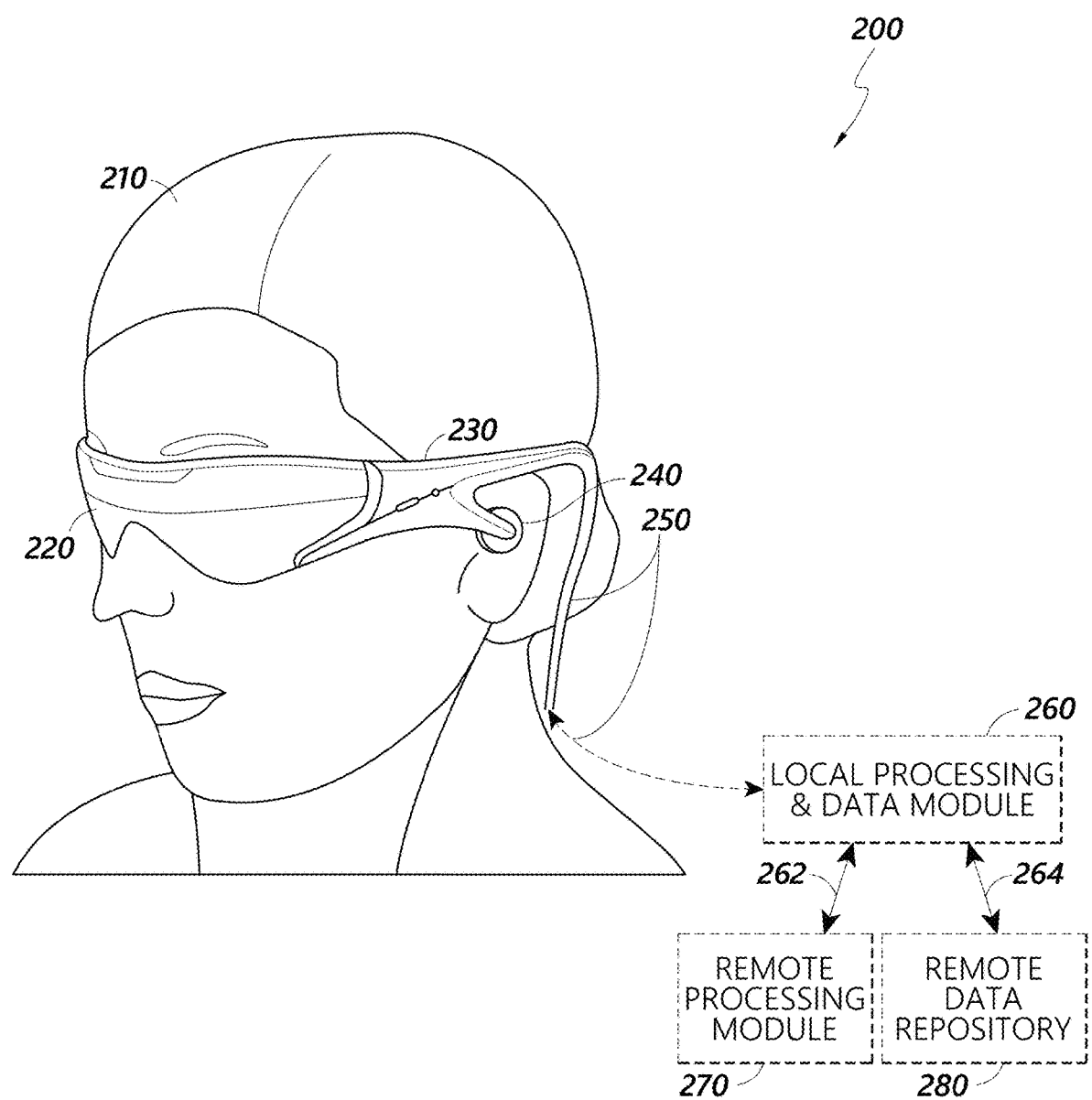
FIG. 2 schematically illustrates an example of a wearable system.

FIG. 2 illustrates an example of wearable system 200 which can be configured to provide an AR/VR/MR scene. The wearable system 200 can also be referred to as the AR system 200. The wearable system 200 includes a display 220, and various mechanical and electronic modules and systems to support the functioning of display 220. The display 220 may be coupled to a frame 230, which is wearable by a user, wearer, or viewer 210. The display 220 can be positioned in front of the eyes of the user 210. The display 220 can present AR/VR/MR content to a user. The display 220 can comprise a head mounted display (HMD) that is worn on the head of the user.

In some embodiments, a speaker 240 is coupled to the frame 230 and positioned adjacent the ear canal of the user (in some embodiments, another speaker, not shown, is positioned adjacent the other ear canal of the user to provide for stereo/shapeable sound control). The display 220 can include an audio sensor (e.g., a microphone) 232 for detecting an audio stream from the environment and capture ambient sound. In some embodiments, one or more other audio sensors, not shown, are positioned to provide stereo sound reception. Stereo sound reception can be used to determine the location of a sound source. The wearable system 200 can perform voice or speech recognition on the audio stream.

The wearable system 200 can include an outward-facing imaging system 464 (shown in FIG. 4) which observes the world in the environment around the user. The wearable system 200 can also include an inward-facing imaging system 462 (shown in FIG. 4) which can track the eye movements of the user. The inward-facing imaging system may track either one eye's movements or both eyes' movements. The inward-facing imaging system 462 may be attached to the frame 230 and may be in electrical communication with the processing modules 260 or 270, which may process image information acquired by the inward-facing imaging system to determine, e.g., the pupil diameters or orientations of the eyes, eye movements or eye pose of the user 210. The inward-facing imaging system 462 may include one or more cameras. For example, at least one camera may be used to image each eye. The images acquired by the cameras may be used to determine pupil size or eye pose for each eye separately, thereby allowing presentation of image information to each eye to be dynamically tailored to that eye.

As an example, the wearable system 200 can use the outward-facing imaging system 464 or the inward-facing imaging system 462 to acquire images of a pose of the user. The images may be still images, frames of a video, or a video.

The display 220 can be operatively coupled 250, such as by a wired lead or wireless connectivity, to a local data processing module 260 which may be mounted in a variety of configurations, such as fixedly attached to the frame 230, fixedly attached to a helmet or hat worn by the user, embedded in headphones, or otherwise removably attached to the user 210 (e.g., in a backpack-style configuration, in a belt-coupling style configuration).

The local processing and data module 260 may comprise a hardware processor, as well as digital memory, such as non-volatile memory (e.g., flash memory), both of which may be utilized to assist in the processing, caching, and storage of data. The data may include data a) captured from sensors (which may be, e.g., operatively coupled to the frame 230 or otherwise attached to the user 210), such as image capture devices (e.g., cameras in the inward-facing imaging system or the outward-facing imaging system), audio sensors (e.g., microphones), inertial measurement units (IMUs), accelerometers, compasses, global positioning system (GPS) units, radio devices, or gyroscopes; or b) acquired or processed using remote processing module 270 or remote data repository 280, possibly for passage to the display 220 after such processing or retrieval. The local processing and data module 260 may be operatively coupled by communication links 262 or 264, such as via wired or wireless communication links, to the remote processing module 270 or remote data repository 280 such that these remote modules are available as resources to the local processing and data module 260. In addition, remote processing module 280 and remote data repository 280 may be operatively coupled to each other.

In some embodiments, the remote processing module 270 may comprise one or more processors configured to analyze and process data or image information. In some embodiments, the remote data repository 280 may comprise a digital data storage facility, which may be available through the internet or other networking configuration in a "cloud" resource configuration. In some embodiments, all data is stored and all computations are performed in the local processing and data module, allowing fully autonomous use from a remote module.

Example Components of A Wearable System

Figure 3:
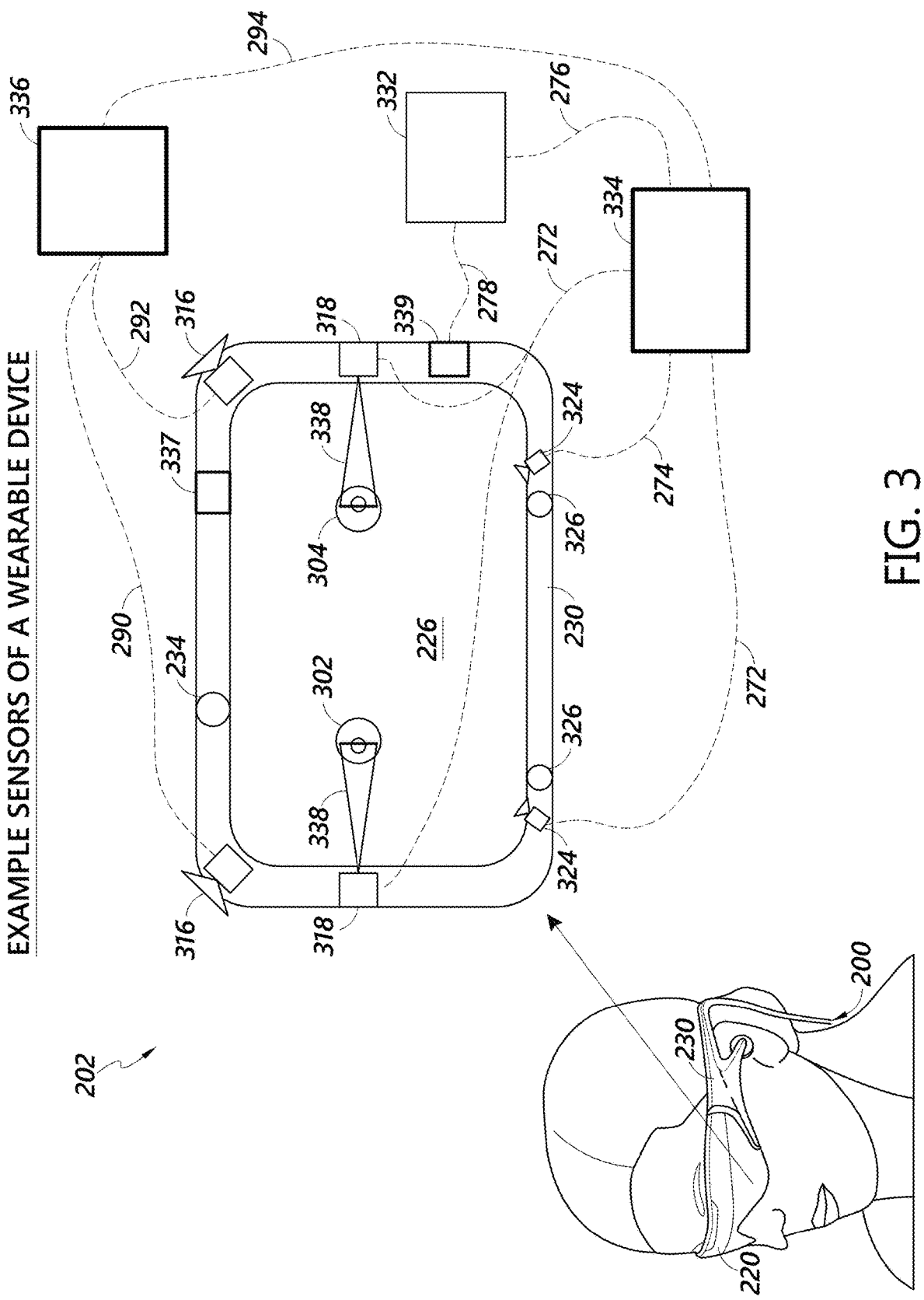
FIG. 3 schematically illustrates example components of a wearable system.

FIG. 3 schematically illustrates example components of a wearable system. FIG. 3 shows a wearable system 200 which can include a display 220 and a frame 230. A blown-up view 202 schematically illustrates various components of the wearable system 200. In certain implements, one or more of the components illustrated in FIG. 3 can be part of the display 220. The various components alone or in combination can collect a variety of data (such as e.g., audio or visual data) associated with the user of the wearable system 200 or the user's environment. It should be appreciated that other embodiments may have additional or fewer components depending on the application for which the wearable system is used. Nevertheless, FIG. 3 provides a basic idea of some of the various components and types of data that may be collected, analyzed, and stored through the wearable system.

FIG. 3 shows an example wearable system 200 which can include the display 220. The display 220 can comprise a display lens 226 that may be mounted to a user's head or a housing or frame 230, which corresponds to the frame 230. The display lens 226 may comprise one or more transparent mirrors positioned by the housing 230 in front of the user's eyes 302, 304 and may be configured to bounce projected light 338 into the eyes 302, 304 and facilitate beam shaping, while also allowing for transmission of at least some light from the local environment. The wavefront of the projected light beam 338 may be bent or focused to coincide with a desired focal distance of the projected light. As illustrated, two wide-field-of-view machine vision cameras 316 (also referred to as world cameras) can be coupled to the housing 230 to image the environment around the user. These cameras 316 can be dual capture visible light/non-visible (e.g., infrared) light cameras. The cameras 316 may be part of the outward-facing imaging system 464 shown in FIG. 4. Image acquired by the world cameras 316 can be processed by the pose processor 336. For example, the pose processor 336 can implement one or more object recognizers 708 (e.g., shown in FIG. 7) to identify a pose of a user or another person in the user's environment or to identify a physical object in the user's environment.

With continued reference to FIG. 3, a pair of scanned-laser shaped-wavefront (e.g., for depth) light projector modules with display mirrors and optics configured to project light 338 into the eyes 302, 304 are shown. The depicted view also shows two miniature infrared cameras 324 paired with infrared light (such as light emitting diodes "LED"s), which are configured to be able to track the eyes 302, 304 of the user to support rendering and user input. The cameras 324 may be part of the inward-facing imaging system 462 shown in FIG. 4 The wearable system 200 can further feature a sensor assembly 339, which may comprise X, Y, and Z axis accelerometer capability as well as a magnetic compass and X, Y, and Z axis gyro capability, preferably providing data at a relatively high frequency, such as 200 Hz. The sensor assembly 339 may be part of the IMU described with reference to FIG. 2A The depicted system 200 can also comprise a head pose processor 336, such as an ASIC (application specific integrated circuit), FPGA (field programmable gate array), or ARM processor (advanced reduced-instruction-set machine), which may be configured to calculate real or near-real time user head pose from wide field of view image information output from the capture devices 316. The head pose processor 336 can be a hardware processor and can be implemented as part of the local processing and data module 260 shown in FIG. 2A.

The wearable system can also include one or more depth sensors 234. The depth sensor 234 can be configured to measure the distance between an object in an environment to a wearable device. The depth sensor 234 may include a laser scanner (e.g., a lidar), an ultrasonic depth sensor, or a depth sensing camera. In certain implementations, where the cameras 316 have depth sensing ability, the cameras 316 may also be considered as depth sensors 234.

Also shown is a processor 332 configured to execute digital or analog processing to derive pose from the gyro, compass, or accelerometer data from the sensor assembly 339. The processor 332 may be part of the local processing and data module 260 shown in FIG. 2. The wearable system 200 as shown in FIG. 3 can also include a position system such as, e.g., a GPS 337 (global positioning system) to assist with pose and positioning analyses. In addition, the GPS may further provide remotely-based (e.g., cloud-based) information about the user's environment. This information may be used for recognizing objects or information in user's environment.

The wearable system may combine data acquired by the GPS 337 and a remote computing system (such as, e.g., the remote processing module 270, another user's ARD, etc.) which can provide more information about the user's environment. As one example, the wearable system can determine the user's location based on GPS data and retrieve a world map (e.g., by communicating with a remote processing module 270) including virtual objects associated with the user's location. As another example, the wearable system 200 can monitor the environment using the world cameras 316 (which may be part of the outward-facing imaging system 464 shown in FIG. 4). Based on the images acquired by the world cameras 316, the wearable system 200 can detect objects in the environment (e.g., by using one or more object recognizers 708 shown in FIG. 7). The wearable system can further use data acquired by the GPS 337 to interpret the characters.

The wearable system 200 may also comprise a rendering engine 334 which can be configured to provide rendering information that is local to the user to facilitate operation of the scanners and imaging into the eyes of the user, for the user's view of the world. The rendering engine 334 may be implemented by a hardware processor (such as, e.g., a central processing unit or a graphics processing unit). In some embodiments, the rendering engine is part of the local processing and data module 260. The rendering engine 334 can be communicatively coupled (e.g., via wired or wireless links) to other components of the wearable system 200. For example, the rendering engine 334, can be coupled to the eye cameras 324 via communication link 274, and be coupled to a projecting subsystem 318 (which can project light into user's eyes 302, 304 via a scanned laser arrangement in a manner similar to a retinal scanning display) via the communication link 272. The rendering engine 334 can also be in communication with other processing units such as, e.g., the sensor pose processor 332 and the image pose processor 336 via links 276 and 294 respectively.

The cameras 324 (e.g., mini infrared cameras) may be utilized to track the eye pose to support rendering and user input. Some example eye poses may include where the user is looking or at what depth he or she is focusing (which may be estimated with eye vergence). The GPS 337, gyros, compass, and accelerometers 339 may be utilized to provide coarse or fast pose estimates. One or more of the cameras 316 can acquire images and pose, which in conjunction with data from an associated cloud computing resource, may be utilized to map the local environment and share user views with others.

The example components depicted in FIG. 3 are for illustration purposes only. Multiple sensors and other functional modules are shown together for ease of illustration and description. Some embodiments may include only one or a subset of these sensors or modules. Further, the locations of these components are not limited to the positions depicted in FIG. 3. Some components may be mounted to or housed within other components, such as a belt-mounted component, a hand-held component, or a helmet component. As one example, the image pose processor 336, sensor pose processor 332, and rendering engine 334 may be positioned in a beltpack and configured to communicate with other components of the wearable system via wireless communication, such as ultra-wideband, Wi-Fi, Bluetooth, etc., or via wired communication. The depicted housing 230 preferably is head-mountable and wearable by the user. However, some components of the wearable system 200 may be worn to other portions of the user's body. For example, the speaker 240 may be inserted into the ears of a user to provide sound to the user.

Regarding the projection of light 338 into the eyes 302, 304 of the user, in some embodiment, the cameras 324 may be utilized to measure where the centers of a user's eyes are geometrically verged to, which, in general, coincides with a position of focus, or "depth of focus", of the eyes. A 3-dimensional surface of all points the eyes verge to can be referred to as the "horopter". The focal distance may take on a finite number of depths, or may be infinitely varying. Light projected from the vergence distance appears to be focused to the subject eye 302, 304, while light in front of or behind the vergence distance is blurred. Examples of wearable devices and other display systems of the present disclosure are also described in U.S. Patent Publication No. 2016/0270656, which is incorporated by reference herein in its entirety.

The human visual system is complicated and providing a realistic perception of depth is challenging. Viewers of an object may perceive the object as being three-dimensional due to a combination of vergence and accommodation. Vergence movements (e.g., rolling movements of the pupils toward or away from each other to converge the lines of sight of the eyes to fixate upon an object) of the two eyes relative to each other are closely associated with focusing (or "accommodation") of the lenses of the eyes. Under normal conditions, changing the focus of the lenses of the eyes, or accommodating the eyes, to change focus from one object to another object at a different distance will automatically cause a matching change in vergence to the same distance, under a relationship known as the "accommodation-vergence reflex." Likewise, a change in vergence will trigger a matching change in accommodation, under normal conditions. Display systems that provide a better match between accommodation and vergence may form more realistic and comfortable simulations of three-dimensional imagery.

Further spatially coherent light with a beam diameter of less than about 0.7 millimeters can be correctly resolved by the human eye regardless of where the eye focuses. Thus, to create an illusion of proper focal depth, the eye vergence may be tracked with the cameras 324, and the rendering engine 334 and projection subsystem 318 may be utilized to render all objects on or close to the horopter in focus, and all other objects at varying degrees of defocus (e.g., using intentionally-created blurring). Preferably, the system 220 renders to the user at a frame rate of about 60 frames per second or greater. As described above, preferably, the cameras 324 may be utilized for eye tracking, and software may be configured to pick up not only vergence geometry but also focus location cues to serve as user inputs. Preferably, such a display system is configured with brightness and contrast suitable for day or night use.

In some embodiments, the display system preferably has latency of less than about 20 milliseconds for visual object alignment, less than about 0.1 degree of angular alignment, and about 1 arc minute of resolution, which, without being limited by theory, is believed to be approximately the limit of the human eye. The display system 220 may be integrated with a localization system, which may involve GPS elements, optical tracking, compass, accelerometers, or other data sources, to assist with position and pose determination; localization information may be utilized to facilitate accurate rendering in the user's view of the pertinent world (e.g., such information would facilitate the glasses to know where they are with respect to the real world).

In some embodiments, the wearable system 200 is configured to display one or more virtual images based on the accommodation of the user's eyes. Unlike prior 3D display approaches that force the user to focus where the images are being projected, in some embodiments, the wearable system is configured to automatically vary the focus of projected virtual content to allow for a more comfortable viewing of one or more images presented to the user. For example, if the user's eyes have a current focus of 1 m, the image may be projected to coincide with the user's focus. If the user shifts focus to 3 m, the image is projected to coincide with the new focus. Thus, rather than forcing the user to a predetermined focus, the wearable system 200 of some embodiments allows the user's eye to a function in a more natural manner.

Such a wearable system 200 may eliminate or reduce the incidences of eye strain, headaches, and other physiological symptoms typically observed with respect to virtual reality devices. To achieve this, various embodiments of the wearable system 200 are configured to project virtual images at varying focal distances, through one or more variable focus elements (VFEs). In one or more embodiments, 3D perception may be achieved through a multi-plane focus system that projects images at fixed focal planes away from the user. Other embodiments employ variable plane focus, wherein the focal plane is moved back and forth in the z-direction to coincide with the user's present state of focus.

In both the multi-plane focus systems and variable plane focus systems, wearable system 200 may employ eye tracking to determine a vergence of the user's eyes, determine the user's current focus, and project the virtual image at the determined focus. In other embodiments, wearable system 200 comprises a light modulator that variably projects, through a fiber scanner, or other light generating source, light beams of varying focus in a raster pattern across the retina. Thus, the ability of the display of the wearable system 200 to project images at varying focal distances not only eases accommodation for the user to view objects in 3D, but may also be used to compensate for user ocular anomalies, as further described in U.S. Patent Publication No. 2016/0270656, which is incorporated by reference herein in its entirety. In some other embodiments, a spatial light modulator may project the images to the user through various optical components. For example, as described further below, the spatial light modulator may project the images onto one or more waveguides, which then transmit the images to the user.

Waveguide Stack Assembly

Figure 4:
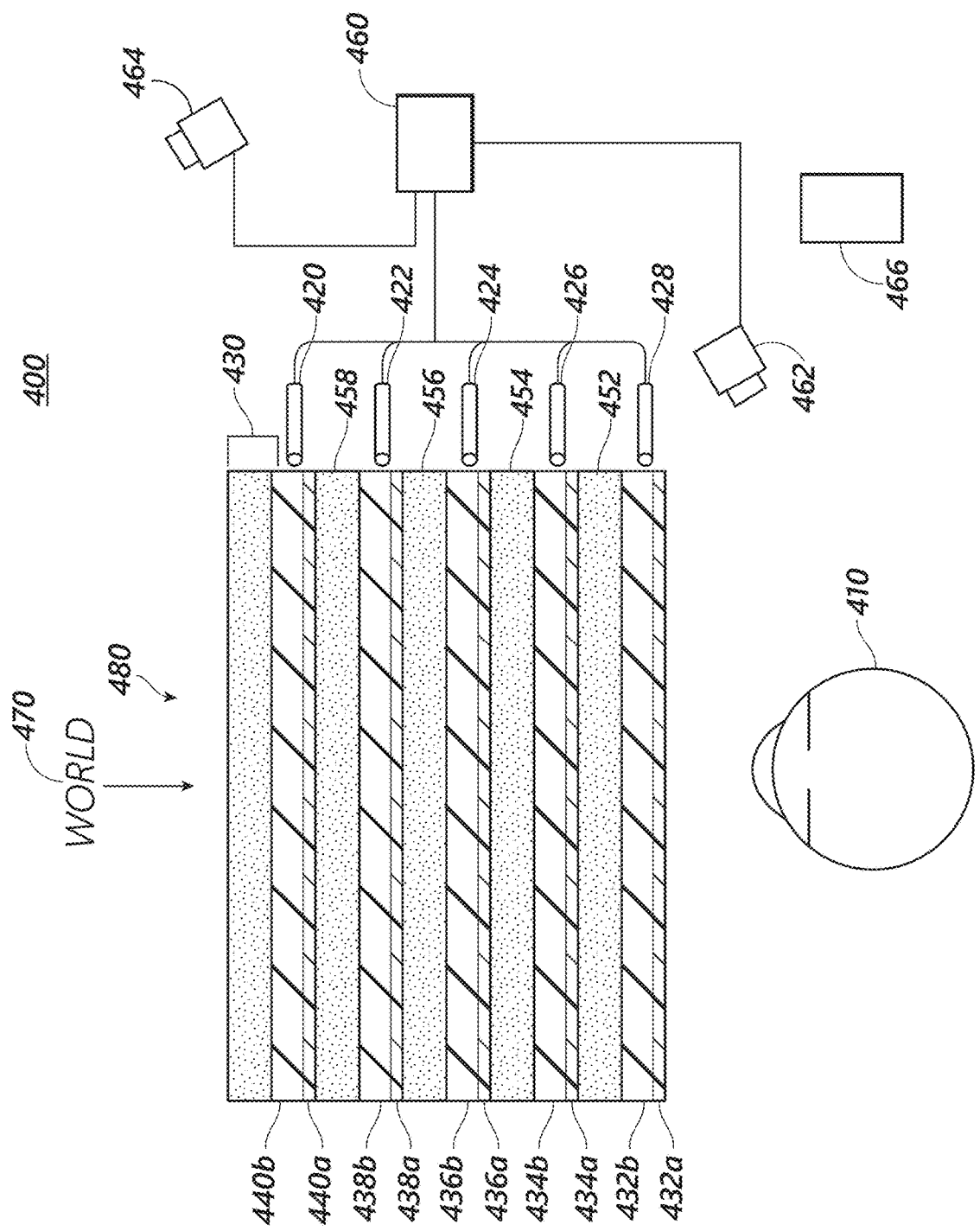
FIG. 4 schematically illustrates an example of a waveguide stack of a wearable device for outputting image information to a user.

FIG. 4 illustrates an example of a waveguide stack for outputting image information to a user. A wearable system 400 includes a stack of waveguides, or stacked waveguide assembly 480 that may be utilized to provide three-dimensional perception to the eye/brain using a plurality of waveguides 432b, 434b, 436b, 438b, 4400b. In some embodiments, the wearable system 400 may correspond to wearable system 200 of FIG. 2, with FIG. 4 schematically showing some parts of that wearable system 200 in greater detail. For example, in some embodiments, the waveguide assembly 480 may be integrated into the display 220 of FIG. 2.

With continued reference to FIG. 4, the waveguide assembly 480 may also include a plurality of features 458, 456, 454, 452 between the waveguides. In some embodiments, the features 458, 456, 454, 452 may be lenses. In other embodiments, the features 458, 456, 454, 452 may not be lenses. Rather, they may simply be spacers (e.g., cladding layers or structures for forming air gaps).

The waveguides 432b, 434b, 436b, 438b, 440b or the plurality of lenses 458, 456, 454, 452 may be configured to send image information to the eye with various levels of wavefront curvature or light ray divergence. Each waveguide level may be associated with a particular depth plane and may be configured to output image information corresponding to that depth plane. Image injection devices 420, 422, 424, 426, 428 may be utilized to inject image information into the waveguides 440b, 438b, 436b, 434b, 432b, each of which may be configured to distribute incoming light across each respective waveguide, for output toward the eye 410. Light exits an output surface of the image injection devices 420, 422, 424, 426, 428 and is injected into a corresponding input edge of the waveguides 440b, 438b, 436b, 434b, 432b. In some embodiments, a single beam of light (e.g., a collimated beam) may be injected into each waveguide to output an entire field of cloned collimated beams that are directed toward the eye 410 at particular angles (and amounts of divergence) corresponding to the depth plane associated with a particular waveguide.

In some embodiments, the image injection devices 420, 422, 424, 426, 428 are discrete displays that each produce image information for injection into a corresponding waveguide 440b, 438b, 436b, 434b, 432b, respectively. In some other embodiments, the image injection devices 420, 422, 424, 426, 428 are the output ends of a single multiplexed display which may, e.g., pipe image information via one or more optical conduits (such as fiber optic cables) to each of the image injection devices 420, 422, 424, 426, 428.

A controller 460 controls the operation of the stacked waveguide assembly 480 and the image injection devices 420, 422, 424, 426, 428. The controller 460 includes programming (e.g., instructions in a non-transitory computer-readable medium) that regulates the timing and provision of image information to the waveguides 440b, 438b, 436b, 434b, 432b. In some embodiments, the controller 460 may be a single integral device, or a distributed system connected by wired or wireless communication channels. The controller 460 may be part of the processing modules 260 or 270 (illustrated in FIG. 2) in some embodiments.

The waveguides 440b, 438b, 436b, 434b, 432b may be configured to propagate light within each respective waveguide by total internal reflection (TIR). The waveguides 440b, 438b, 436b, 434b, 432b may each be planar or have another shape (e.g., curved), with major top and bottom surfaces and edges extending between those major top and bottom surfaces. In the illustrated configuration, the waveguides 440b, 438b, 436b, 434b, 432b may each include light extracting optical elements 440a, 438a, 436a, 434a, 432a that are configured to extract light out of a waveguide by redirecting the light, propagating within each respective waveguide, out of the waveguide to output image information to the eye 410. Extracted light may also be referred to as outcoupled light, and light extracting optical elements may also be referred to as outcoupling optical elements. An extracted beam of light is outputted by the waveguide at locations at which the light propagating in the waveguide strikes a light redirecting element. The light extracting optical elements (440a, 438a, 436a, 434a, 432a) may, for example, be reflective or diffractive optical features. While illustrated disposed at the bottom major surfaces of the waveguides 440b, 438b, 436b, 434b, 432b for ease of description and drawing clarity, in some embodiments, the light extracting optical elements 440a, 438a, 436a, 434a, 432a may be disposed at the top or bottom major surfaces, or may be disposed directly in the volume of the waveguides 440b, 438b, 436b, 434b, 432b. In some embodiments, the light extracting optical elements 440a, 438a, 436a, 434a, 432a may be formed in a layer of material that is attached to a transparent substrate to form the waveguides 440b, 438b, 436b, 434b, 432b. In some other embodiments, the waveguides 440b, 438b, 436b, 434b, 432b may be a monolithic piece of material and the light extracting optical elements 440a, 438a, 436a, 434a, 432a may be formed on a surface or in the interior of that piece of material.

With continued reference to FIG. 4, as discussed herein, each waveguide 440b, 438b, 436b, 434b, 432b is configured to output light to form an image corresponding to a particular depth plane. For example, the waveguide 432b nearest the eye may be configured to deliver collimated light, as injected into such waveguide 432b, to the eye 410. The collimated light may be representative of the optical infinity focal plane. The next waveguide up 434b may be configured to send out collimated light which passes through the first lens 452 (e.g., a negative lens) before it can reach the eye 410. First lens 452 may be configured to create a slight convex wavefront curvature so that the eye/brain interprets light coming from that next waveguide up 434b as coming from a first focal plane closer inward toward the eye 410 from optical infinity. Similarly, the third up waveguide 436b passes its output light through both the first lens 452 and second lens 454 before reaching the eye 410. The combined optical power of the first and second lenses 452 and 454 may be configured to create another incremental amount of wavefront curvature so that the eye/brain interprets light coming from the third waveguide 436b as coming from a second focal plane that is even closer inward toward the person from optical infinity than was light from the next waveguide up 434b.

The other waveguide layers (e.g., waveguides 438b, 440b) and lenses (e.g., lenses 456, 458) are similarly configured, with the highest waveguide 440b in the stack sending its output through all of the lenses between it and the eye for an aggregate focal power representative of the closest focal plane to the person. To compensate for the stack of lenses 458, 456, 454, 452 when viewing/interpreting light coming from the world 470 on the other side of the stacked waveguide assembly 480, a compensating lens layer 430 may be disposed at the top of the stack to compensate for the aggregate power of the lens stack 458, 456, 454, 452 below. Such a configuration provides as many perceived focal planes as there are available waveguide/lens pairings. Both the light extracting optical elements of the waveguides and the focusing aspects of the lenses may be static (e.g., not dynamic or electro-active). In some alternative embodiments, either or both may be dynamic using electro-active features.

With continued reference to FIG. 4, the light extracting optical elements 440a, 438a, 436a, 434a, 432a may be configured to both redirect light out of their respective waveguides and to output this light with the appropriate amount of divergence or collimation for a particular depth plane associated with the waveguide. As a result, waveguides having different associated depth planes may have different configurations of light extracting optical elements, which output light with a different amount of divergence depending on the associated depth plane. In some embodiments, as discussed herein, the light extracting optical elements 440a, 438a, 436a, 434a, 432a may be volumetric or surface features, which may be configured to output light at specific angles. For example, the light extracting optical elements 440a, 438a, 436a, 434a, 432a may be volume holograms, surface holograms, and/or diffraction gratings. Light extracting optical elements, such as diffraction gratings, are described in U.S. Patent Publication No. 2015/0178939, published Jun. 25, 2015, which is incorporated by reference herein in its entirety.

In some embodiments, the light extracting optical elements 440a, 438a, 436a, 434a, 432a are diffractive features that form a diffraction pattern, or "diffractive optical element" (also referred to herein as a "DOE"). Preferably, the DOE has a relatively low diffraction efficiency so that only a portion of the light of the beam is deflected away toward the eye 410 with each intersection of the DOE, while the rest continues to move through a waveguide via total internal reflection. The light carrying the image information can thus be divided into a number of related exit beams that exit the waveguide at a multiplicity of locations and the result is a fairly uniform pattern of exit emission toward the eye 304 for this particular collimated beam bouncing around within a waveguide.

In some embodiments, one or more DOEs may be switchable between "on" state in which they actively diffract, and "off" state in which they do not significantly diffract. For instance, a switchable DOE may comprise a layer of polymer dispersed liquid crystal, in which microdroplets comprise a diffraction pattern in a host medium, and the refractive index of the microdroplets can be switched to substantially match the refractive index of the host material (in which case the pattern does not appreciably diffract incident light) or the microdroplet can be switched to an index that does not match that of the host medium (in which case the pattern actively diffracts incident light).

In some embodiments, the number and distribution of depth planes or depth of field may be varied dynamically based on the pupil sizes or orientations of the eyes of the viewer. Depth of field may change inversely with a viewer's pupil size. As a result, as the sizes of the pupils of the viewer's eyes decrease, the depth of field increases such that one plane that is not discernible because the location of that plane is beyond the depth of focus of the eye may become discernible and appear more in focus with reduction of pupil size and commensurate with the increase in depth of field. Likewise, the number of spaced apart depth planes used to present different images to the viewer may be decreased with the decreased pupil size. For example, a viewer may not be able to clearly perceive the details of both a first depth plane and a second depth plane at one pupil size without adjusting the accommodation of the eye away from one depth plane and to the other depth plane. These two depth planes may, however, be sufficiently in focus at the same time to the user at another pupil size without changing accommodation.

In some embodiments, the display system may vary the number of waveguides receiving image information based upon determinations of pupil size or orientation, or upon receiving electrical signals indicative of particular pupil size or orientation. For example, if the user's eyes are unable to distinguish between two depth planes associated with two waveguides, then the controller 460 (which may be an embodiment of the local processing and data module 260) can be configured or programmed to cease providing image information to one of these waveguides. Advantageously, this may reduce the processing burden on the system, thereby increasing the responsiveness of the system. In embodiments in which the DOEs for a waveguide are switchable between the on and off states, the DOEs may be switched to the off state when the waveguide does receive image information.

In some embodiments, it may be desirable to have an exit beam meet the condition of having a diameter that is less than the diameter of the eye of a viewer. However, meeting this condition may be challenging in view of the variability in size of the viewer's pupils. In some embodiments, this condition is met over a wide range of pupil sizes by varying the size of the exit beam in response to determinations of the size of the viewer's pupil. For example, as the pupil size decreases, the size of the exit beam may also decrease. In some embodiments, the exit beam size may be varied using a variable aperture.

The wearable system 400 can include an outward-facing imaging system 464 (e.g., a digital camera) that images a portion of the world 470. This portion of the world 470 may be referred to as the field of view (FOV) of a world camera and the imaging system 464 is sometimes referred to as an FOV camera. The FOV of the world camera may or may not be the same as the FOV of a viewer 210 which encompasses a portion of the world 470 the viewer 210 perceives at a given time. For example, in some situations, the FOV of the world camera may be larger than the viewer 210 of the viewer 210 of the wearable system 400. The entire region available for viewing or imaging by a viewer may be referred to as the field of regard (FOR). The FOR may include $4\pi$ steradians of solid angle surrounding the wearable system 400 because the wearer can move his body, head, or eyes to perceive substantially any direction in space. In other contexts, the wearer's movements may be more constricted, and accordingly the wearer's FOR may subtend a smaller solid angle. Images obtained from the outward-facing imaging system 464 can be used to track gestures made by the user (e.g., hand or finger gestures), detect objects in the world 470 in front of the user, and so forth.

The wearable system 400 can include an audio sensor 232, e.g., a microphone, to capture ambient sound. As described above, in some embodiments, one or more other audio sensors can be positioned to provide stereo sound reception useful to the determination of location of a speech source. The audio sensor 232 can comprise a directional microphone, as another example, which can also provide such useful directional information as to where the audio source is located. The wearable system 400 can use information from both the outward-facing imaging system 464 and the audio sensor 230 in locating a source of speech, or to determine an active speaker at a particular moment in time, etc. For example, the wearable system 400 can use the voice recognition alone or in combination with a reflected image of the speaker (e.g., as seen in a mirror) to determine the identity of the speaker. As another example, the wearable system 400 can determine a position of the speaker in an environment based on sound acquired from directional microphones. The wearable system 400 can parse the sound coming from the speaker's position with speech recognition algorithms to determine the content of the speech and use voice recognition techniques to determine the identity (e.g., name or other demographic information) of the speaker.

The wearable system 400 can also include an inward-facing imaging system 466 (e.g., a digital camera), which observes the movements of the user, such as the eye movements and the facial movements. The inward-facing imaging system 466 may be used to capture images of the eye 410 to determine the size and/or orientation of the pupil of the eye 304. The inward-facing imaging system 466 can be used to obtain images for use in determining the direction the user is looking (e.g., eye pose) or for biometric identification of the user (e.g., via iris identification). In some embodiments, at least one camera may be utilized for each eye, to separately determine the pupil size or eye pose of each eye independently, thereby allowing the presentation of image information to each eye to be dynamically tailored to that eye. In some other embodiments, the pupil diameter or orientation of only a single eye 410 (e.g., using only a single camera per pair of eyes) is determined and assumed to be similar for both eyes of the user. The images obtained by the inward-facing imaging system 466 may be analyzed to determine the user's eye pose or mood, which can be used by the wearable system 400 to decide which audio or visual content should be presented to the user. The wearable system 400 may also determine head pose (e.g., head position or head orientation) using sensors such as IMUs, accelerometers, gyroscopes, etc.

The wearable system 400 can include a user input device 466 by which the user can input commands to the controller 460 to interact with the wearable system 400. For example, the user input device 466 can include a trackpad, a touchscreen, a joystick, a multiple degree-of-freedom (DOF) controller, a capacitive sensing device, a game controller, a keyboard, a mouse, a directional pad (D-pad), a wand, a haptic device, a totem (e.g., functioning as a virtual user input device), and so forth. A multi-DOF controller can sense user input in some or all possible translations (e.g., left/right, forward/backward, or up/down) or rotations (e.g., yaw, pitch, or roll) of the controller. A multi-DOF controller which supports the translation movements may be referred to as a 3DOF while a multi-DOF controller which supports the translations and rotations may be referred to as 6DOF. In some cases, the user may use a finger (e.g., a thumb) to press or swipe on a touch-sensitive input device to provide input to the wearable system 400 (e.g., to provide user input to a user interface provided by the wearable system 400). The user input device 466 may be held by the user's hand during the use of the wearable system 400. The user input device 466 can be in wired or wireless communication with the wearable system 400.

Other Components of the Wearable System

In many implementations, the wearable system may include other components in addition or in alternative to the components of the wearable system described above. The wearable system may, for example, include one or more haptic devices or components. The haptic devices or components may be operable to provide a tactile sensation to a user. For example, the haptic devices or components may provide a tactile sensation of pressure or texture when touching virtual content (e.g., virtual objects, virtual tools, other virtual constructs). The tactile sensation may replicate a feel of a physical object which a virtual object represents, or may replicate a feel of an imagined object or character (e.g., a dragon) which the virtual content represents. In some implementations, haptic devices or components may be worn by the user (e.g., a user wearable glove). In some implementations, haptic devices or components may be held by the user.

The wearable system may, for example, include one or more physical objects which are manipulable by the user to allow input or interaction with the wearable system. These physical objects may be referred to herein as totems. Some totems may take the form of inanimate objects, such as for example, a piece of metal or plastic, a wall, a surface of table. In certain implementations, the totems may not actually have any physical input structures (e.g., keys, triggers, joystick, trackball, rocker switch). Instead, the totem may simply provide a physical surface, and the wearable system may render a user interface so as to appear to a user to be on one or more surfaces of the totem. For example, the wearable system may render an image of a computer keyboard and trackpad to appear to reside on one or more surfaces of a totem. For example, the wearable system may render a virtual computer keyboard and virtual trackpad to appear on a surface of a thin rectangular plate of aluminum which serves as a totem. The rectangular plate does not itself have any physical keys or trackpad or sensors. However, the wearable system may detect user manipulation or interaction or touches with the rectangular plate as selections or inputs made via the virtual keyboard or virtual trackpad. The user input device 466 (shown in FIG. 4) may be an embodiment of a totem, which may include a trackpad, a touchpad, a trigger, a joystick, a trackball, a rocker or virtual switch, a mouse, a keyboard, a multi-degree-of-freedom controller, or another physical input device. A user may use the totem, alone or in combination with poses, to interact with the wearable system or other users.

Examples of haptic devices and totems usable with the wearable devices, HMD, and display systems of the present disclosure are described in U.S. Patent Publication No. 2015/0016777, which is incorporated by reference herein in its entirety.

Example Processes of User Interactions with a Wearable System

Figure 5:
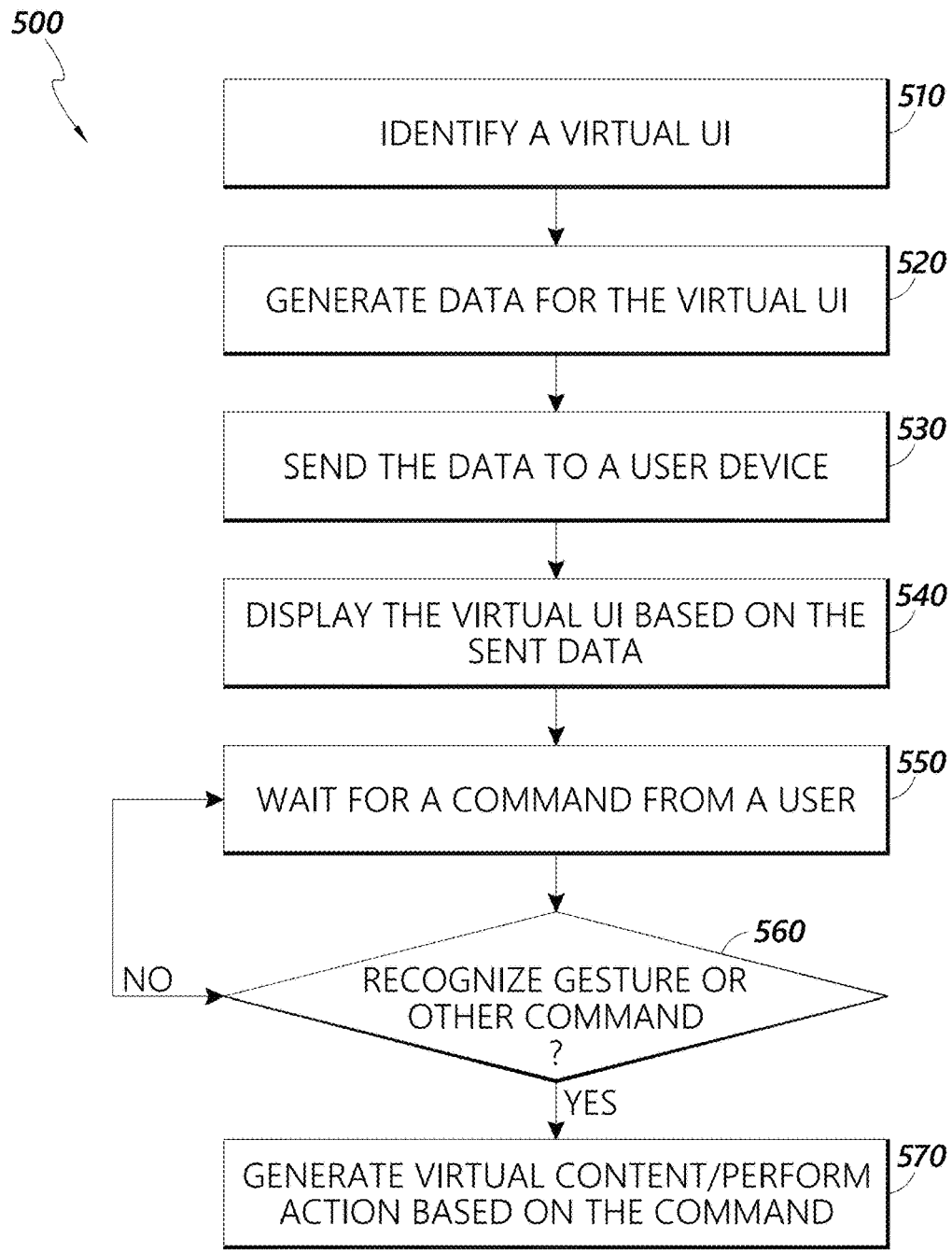
FIG. 5 is a process flow diagram of an example of a method for interacting with a virtual user interface.

FIG. 5 is a process flow diagram of an example of a method 500 for interacting with a virtual user interface. The method 500 may be performed by the wearable system described herein. Embodiments of the method 500 can be used by the wearable system to detect persons or documents in the FOV of the wearable system.

At block 510, the wearable system may identify a particular UI. The type of UI may be predetermined by the user. The wearable system may identify that a particular UI needs to be populated based on a user input (e.g., gesture, visual data, audio data, sensory data, direct command, etc.). The UI can be specific to a security scenario where the wearer of the system is observing users who present documents to the wearer (e.g., at a travel checkpoint). At block 520, the wearable system may generate data for the virtual UI. For example, data associated with the confines, general structure, shape of the UI etc., may be generated. In addition, the wearable system may determine map coordinates of the user's physical location so that the wearable system can display the UI in relation to the user's physical location. For example, if the UI is body centric, the wearable system may determine the coordinates of the user's physical stance, head pose, or eye pose such that a ring UI can be displayed around the user or a planar UI can be displayed on a wall or in front of the user. In the security context described herein, the UI may be displayed as if the UI were surrounding the traveler who is presenting documents to the wearer of the system, so that the wearer can readily view the UI while looking at the traveler and the traveler's documents. If the UI is hand centric, the map coordinates of the user's hands may be determined. These map points may be derived through data received through the FOV cameras, sensory input, or any other type of collected data.

At block 530, the wearable system may send the data to the display from the cloud or the data may be sent from a local database to the display components. At block 540, the UI is displayed to the user based on the sent data. For example, a light field display can project the virtual UI into one or both of the user's eyes. Once the virtual UI has been created, the wearable system may simply wait for a command from the user to generate more virtual content on the virtual UI at block 550. For example, the UI may be a body centric ring around the user's body or the body of a person in the user's environment (e.g., a traveler). The wearable system may then wait for the command (a gesture, a head or eye movement, voice command, input from a user input device, etc.), and if it is recognized (block 560), virtual content associated with the command may be displayed to the user (block 570).

Examples of Avatar Rendering in Mixed Reality

A wearable system may employ various mapping related techniques in order to achieve high depth of field in the rendered light fields. In mapping out the virtual world, it is advantageous to know all the features and points in the real world to accurately portray virtual objects in relation to the real world. To this end, FOV images captured from users of the wearable system can be added to a world model by including new pictures that convey information about various points and features of the real world. For example, the wearable system can collect a set of map points (such as 2D points or 3D points) and find new map points to render a more accurate version of the world model. The world model of a first user can be communicated (e.g., over a network such as a cloud network) to a second user so that the second user can experience the world surrounding the first user.

Figure 6A:
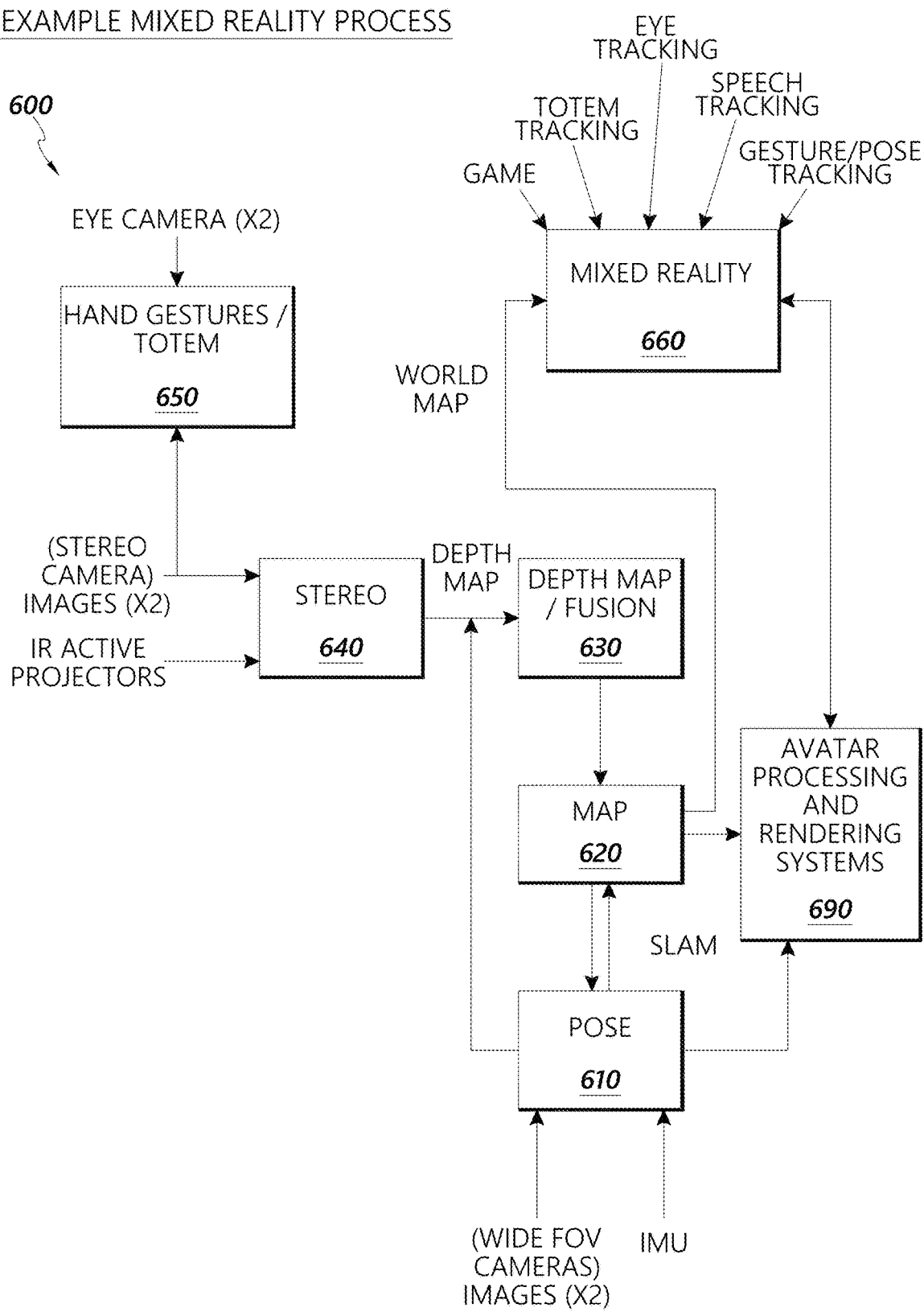
FIG. 6A is a block diagram of another example of a wearable system which can comprise an avatar processing and rendering system.

FIG. 6A is a block diagram of another example of a wearable system which can comprise an avatar processing and rendering system 690 in a mixed reality environment. The wearable system 600 may be part of the wearable system 200 shown in FIG. 2. In this example, the wearable system 600 can comprise a map 620, which may include at least a portion of the data in the map database 710 (shown in FIG. 7). The map may partly reside locally on the wearable system, and may partly reside at networked storage locations accessible by wired or wireless network (e.g., in a cloud system). A pose process 610 may be executed on the wearable computing architecture (e.g., processing module 260 or controller 460) and utilize data from the map 620 to determine position and orientation of the wearable computing hardware or user. Pose data may be computed from data collected on the fly as the user is experiencing the system and operating in the world. The data may comprise images, data from sensors (such as inertial measurement units, which generally comprise accelerometer and gyroscope components) and surface information pertinent to objects in the real or virtual environment.

A sparse point representation may be the output of a simultaneous localization and mapping (e.g., SLAM or vSLAM, referring to a configuration wherein the input is images/visual only) process. The system can be configured to not only find out where in the world the various components are, but what the world is made of. Pose may be a building block that achieves many goals, including populating the map and using the data from the map.

In one embodiment, a sparse point position may not be completely adequate on its own, and further information may be needed to produce a multifocal AR, VR, or MR experience. Dense representations, generally referring to depth map information, may be utilized to fill this gap at least in part. Such information may be computed from a process referred to as Stereo 640, wherein depth information is determined using a technique such as triangulation or time-of-flight sensing. Image information and active patterns (such as infrared patterns created using active projectors), images acquired from image cameras, or hand gestures/totem 650 may serve as input to the Stereo process 640. A significant amount of depth map information may be fused together, and some of this may be summarized with a surface representation. For example, mathematically definable surfaces may be efficient (e.g., relative to a large point cloud) and digestible inputs to other processing devices like game engines. Thus, the output of the stereo process (e.g., a depth map) 640 may be combined in the fusion process 630. Pose 610 may be an input to this fusion process 630 as well, and the output of fusion 630 becomes an input to populating the map process 620. Sub-surfaces may connect with each other, such as in topographical mapping, to form larger surfaces, and the map becomes a large hybrid of points and surfaces.

To resolve various aspects in a mixed reality process 660, various inputs may be utilized. For example, in the embodiment depicted in FIG. 6A, Game parameters may be inputs to determine that the user of the system is playing a monster battling game with one or more monsters at various locations, monsters dying or running away under various conditions (such as if the user shoots the monster), walls or other objects at various locations, and the like. The world map may include information regarding the location of the objects or semantic information of the objects (e.g., classifications such as whether the object is flat or round, horizontal or vertical, a table or a lamp, etc.) and the world map can be another valuable input to mixed reality. Pose relative to the world becomes an input as well and plays a key role to almost any interactive system.

Controls or inputs from the user are another input to the wearable system 600. As described herein, user inputs can include visual input, gestures, totems, audio input, sensory input, etc. In order to move around or play a game, for example, the user may need to instruct the wearable system 600 regarding what he or she wants to do. Beyond just moving oneself in space, there are various forms of user controls that may be utilized. In one embodiment, a totem (e.g. a user input device), or an object such as a toy gun may be held by the user and tracked by the system. The system preferably will be configured to know that the user is holding the item and understand what kind of interaction the user is having with the item (e.g., if the totem or object is a gun, the system may be configured to understand location and orientation, as well as whether the user is clicking a trigger or other sensed button or element which may be equipped with a sensor, such as an IMU, which may assist in determining what is going on, even when such activity is not within the field of view of any of the cameras.)

Hand gesture tracking or recognition may also provide input information. The wearable system 600 may be configured to track and interpret hand gestures for button presses, for gesturing left or right, stop, grab, hold, etc. For example, in one configuration, the user may want to flip through emails or a calendar in a non-gaming environment, or do a "fist bump" with another person or player. The wearable system 600 may be configured to leverage a minimum amount of hand gesture, which may or may not be dynamic. For example, the gestures may be simple static gestures like open hand for stop, thumbs up for ok, thumbs down for not ok; or a hand flip right, or left, or up/down for directional commands.

Eye tracking is another input (e.g., tracking where the user is looking to control the display technology to render at a specific depth or range). In one embodiment, vergence of the eyes may be determined using triangulation, and then using a vergence/accommodation model developed for that particular person, accommodation may be determined. Eye tracking can be performed by the eye camera(s) to determine eye gaze (e.g., direction or orientation of one or both eyes). Other techniques can be used for eye tracking such as, e.g., measurement of electrical potentials by electrodes placed near the eye(s) (e.g., electrooculography).

Speech tracking can be another input can be used alone or in combination with other inputs (e.g., totem tracking, eye tracking, gesture tracking, etc.). Speech tracking may include speech recognition, voice recognition, alone or in combination. The system 600 can include an audio sensor (e.g., a microphone) that receives an audio stream from the environment. The system 600 can incorporate voice recognition technology to determine who is speaking (e.g., whether the speech is from the wearer of the ARD or another person or voice (e.g., a recorded voice transmitted by a loudspeaker in the environment)) as well as speech recognition technology to determine what is being said. The local data & processing module 260 or the remote processing module 270 can process the audio data from the microphone (or audio data in another stream such as, e.g., a video stream being watched by the user) to identify content of the speech by applying various speech recognition algorithms, such as, e.g., hidden Markov models, dynamic time warping (DTW)-based speech recognitions, neural networks, deep learning algorithms such as deep feedforward and recurrent neural networks, end-to-end automatic speech recognitions, machine learning algorithms (described with reference to FIG. 7), or other algorithms that uses acoustic modeling or language modeling, etc.

The local data & processing module 260 or the remote processing module 270 can also apply voice recognition algorithms which can identify the identity of the speaker, such as whether the speaker is the user 210 of the wearable system 600 or another person with whom the user is conversing. Some example voice recognition algorithms can include frequency estimation, hidden Markov models, Gaussian mixture models, pattern matching algorithms, neural networks, matrix representation, Vector Quantization, speaker diarisation, decision trees, and dynamic time warping (DTW) technique. Voice recognition techniques can also include anti-speaker techniques, such as cohort models, and world models. Spectral features may be used in representing speaker characteristics. The local data & processing module or the remote data processing module 270 can use various machine learning algorithms described with reference to FIG. 7 to perform the voice recognition.

An implementation of a wearable system can use these user controls or inputs via a UI. UI elements (e.g., controls, popup windows, bubbles, data entry fields, etc.) can be used, for example, to dismiss a display of information, e.g., graphics or semantic information of an object.

With regard to the camera systems, the example wearable system 600 shown in FIG. 6A can include three pairs of cameras: a relative wide FOV or passive SLAM pair of cameras arranged to the sides of the user's face, a different pair of cameras oriented in front of the user to handle the stereo imaging process 640 and also to capture hand gestures and totem/object tracking in front of the user's face. The FOV cameras and the pair of cameras for the stereo process 640 may be a part of the outward-facing imaging system 464 (shown in FIG. 4). The wearable system 600 can include eye tracking cameras (which may be a part of an inward-facing imaging system 462 shown in FIG. 4) oriented toward the eyes of the user in order to triangulate eye vectors and other information. The wearable system 600 may also comprise one or more textured light projectors (such as infrared (IR) projectors) to inject texture into a scene.

The wearable system 600 can comprise an avatar processing and rendering system 690. The avatar processing and rendering system 690 can be configured to generate, update, animate, and render an avatar based on contextual information. Some or all of the avatar processing and rendering system 690 can be implemented as part of the local processing and data module 260 or the remote processing module 262, 264 alone or in combination. In various embodiments, multiple avatar processing and rendering systems 690 (e.g., as implemented on different wearable devices) can be used for rendering the virtual avatar 670. For example, a first user's wearable device may be used to determine the first user's intent, while a second user's wearable device can determine an avatar's characteristics and render the avatar of the first user based on the intent received from the first user's wearable device. The first user's wearable device and the second user's wearable device (or other such wearable devices) can communicate via a network, for example, as will be described with reference to FIGS. 9A and 9B.

Figure 6B:
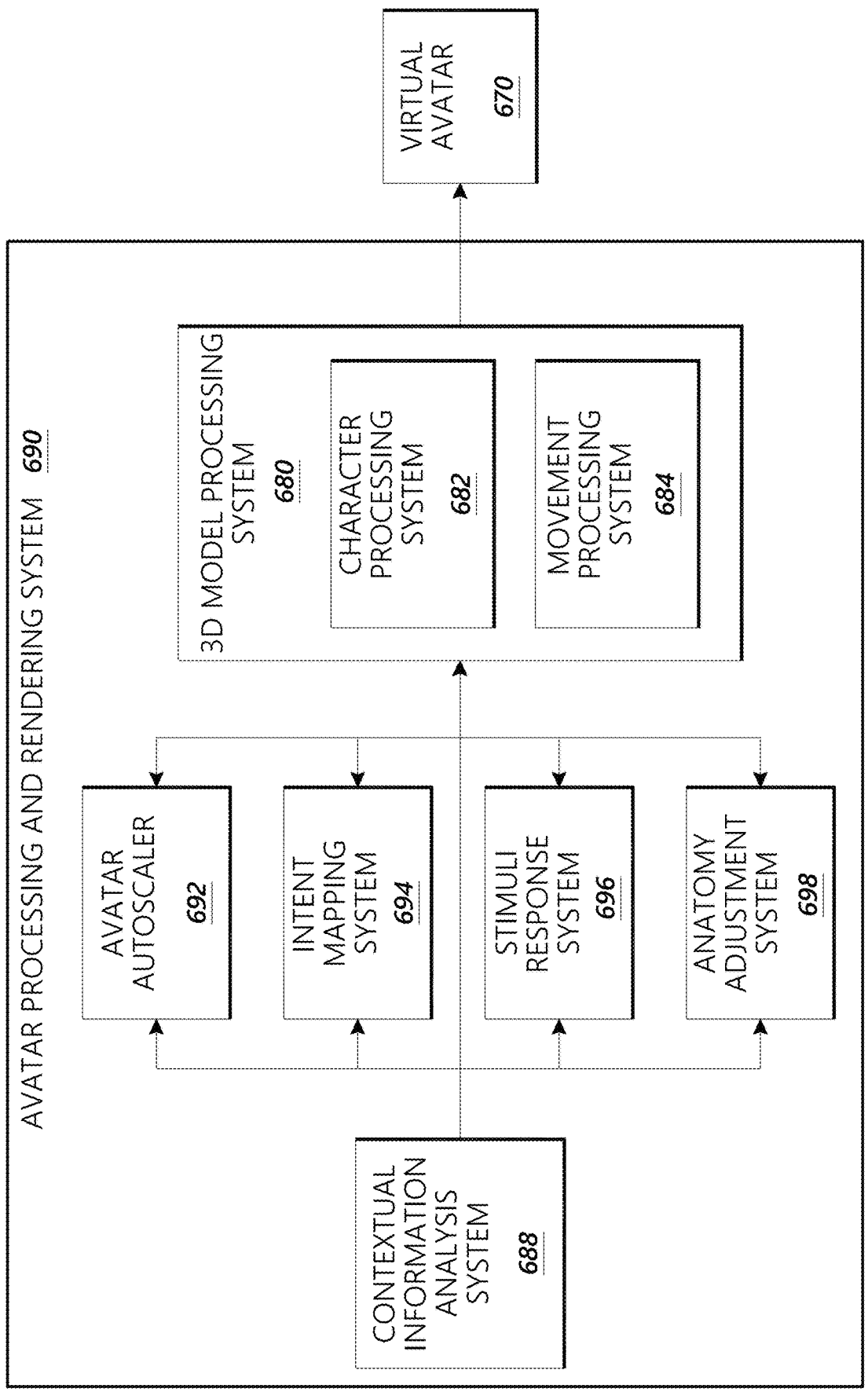
FIG. 6B illustrates example components of an avatar processing and rendering system.

FIG. 6B illustrates an example avatar processing and rendering system 690. The avatar processing and rendering system 690 can implement the mesh transfer techniques described with reference to FIGS. 11-14C. The example avatar processing and rendering system 690 can comprise a 3D model processing system 680, a contextual information analysis system 688, an avatar autoscaler 692, an intent mapping system 694, an anatomy adjustment system 698, a stimuli response system 696, alone or in combination. The system 690 is intended to illustrate functionalities for avatar processing and rendering and is not intended to be limiting. For example, in certain implementations, one or more of these systems may be part of another system. For example, portions of the contextual information analysis system 688 may be part of the avatar autoscaler 692, intent mapping system 694, stimuli response system 696, or anatomy adjustment system 698, individually or in combination.

The contextual information analysis system 688 can be configured to determine environment and object information based on one or more device sensors described with reference to FIGS. 2 and 3. For example, the contextual information analysis system 688 can analyze environments and objects (including physical or virtual objects) of a user's environment or an environment in which the user's avatar is rendered, using images acquired by the outward-facing imaging system 464 of the user or the viewer of the user's avatar. The contextual information analysis system 688 can analyze such images alone or in combination with a data acquired from location data or world maps (e.g., maps 620, 710, 910) to determine the location and layout of objects in the environments. The contextual information analysis system 688 can also access biological features of the user or human in general for animating the virtual avatar 670 realistically. For example, the contextual information analysis system 688 can generate a discomfort curve which can be applied to the avatar such that a portion of the user's avatar's body (e.g., the head) is not at an uncomfortable (or unrealistic) position with respect to the other portions of the user's body (e.g., the avatar's head is not turned 270 degrees). In certain implementations, one or more object recognizers 708 (shown in FIG. 7) may be implemented as part of the contextual information analysis system 688.

The avatar autoscaler 692, the intent mapping system 694, and the stimuli response system 696, and anatomy adjustment system 698 can be configured to determine the avatar's characteristics based on contextual information. Some example characteristics of the avatar can include the size, appearance, position, orientation, movement, pose, expression, etc. The avatar autoscaler 692 can be configured to automatically scale the avatar such that the user does not have to look at the avatar at an uncomfortable pose. For example, the avatar autoscaler 692 can increase or decrease the size of the avatar to bring the avatar to the user's eye level such that the user does not need to look down at the avatar or look up at the avatar respectively. The intent mapping system 694 can determine an intent of a user's interaction and map the intent to an avatar (rather than the exact user interaction) based on the environment that the avatar is rendered in. For example, an intent of a first user may be to communicate with a second user in a telepresence session (see, e.g., FIG. 9B). Typically, two people face each other when communicating. The intent mapping system 694 of the first user's wearable system can determine that such a face-to-face intent exists during the telepresence session and can cause the first user's wearable system to render the second user's avatar to be facing the first user. If the second user were to physically turn around, instead of rendering the second user's avatar in a turned position (which would cause the back of the second user's avatar to be rendered to the first user), the first user's intent mapping system 694 can continue to render the second avatar's face to the first user, which is the inferred intent of the telepresence session (e.g., face-to-face intent in this example).

The stimuli response system 696 can identify an object of interest in the environment and determine an avatar's response to the object of interest. For example, the stimuli response system 696 can identify a sound source in an avatar's environment and automatically turn the avatar to look at the sound source. The stimuli response system 696 can also determine a threshold termination condition. For example, the stimuli response system 696 can cause the avatar to go back to its original pose after the sound source disappears or after a period of time has elapsed.

The anatomy adjustment system 698 can be configured to adjust the user's pose based on biological features. For example, the anatomy adjustment system 698 can be configured to adjust relative positions between the user's head and the user's torso or between the user's upper body and lower body based on a discomfort curve.

The 3D model processing system 680 can be configured to animate and cause the display 220 to render a virtual avatar 670. The 3D model processing system 680 can include a virtual character processing system 682 and a movement processing system 684. The virtual character processing system 682 can be configured to generate and update a 3D model of a user (for creating and animating the virtual avatar). The movement processing system 684 can be configured to animate the avatar, such as, e.g., by changing the avatar's pose, by moving the avatar around in a user's environment, or by animating the avatar's facial expressions, etc. As will further be described herein, the virtual avatar can be animated using rigging techniques. In some embodiments, an avatar is represented in two parts: a surface representation (e.g., a deformable mesh) that is used to render the outward appearance of the virtual avatar and a hierarchical set of interconnected joints (e.g., a core skeleton) for animating the mesh. In some implementations, the virtual character processing system 682 can be configured to edit or generate surface representations, while the movement processing system 684 can be used to animate the avatar by moving the avatar, deforming the mesh, etc. For example, in some implementations, the movement processing system 684 performs embodiments of the joint decomposition processes described herein (e.g., the process 1400 described with reference to FIG. 14).

Examples of Mapping a User's Environment

Figure 7:
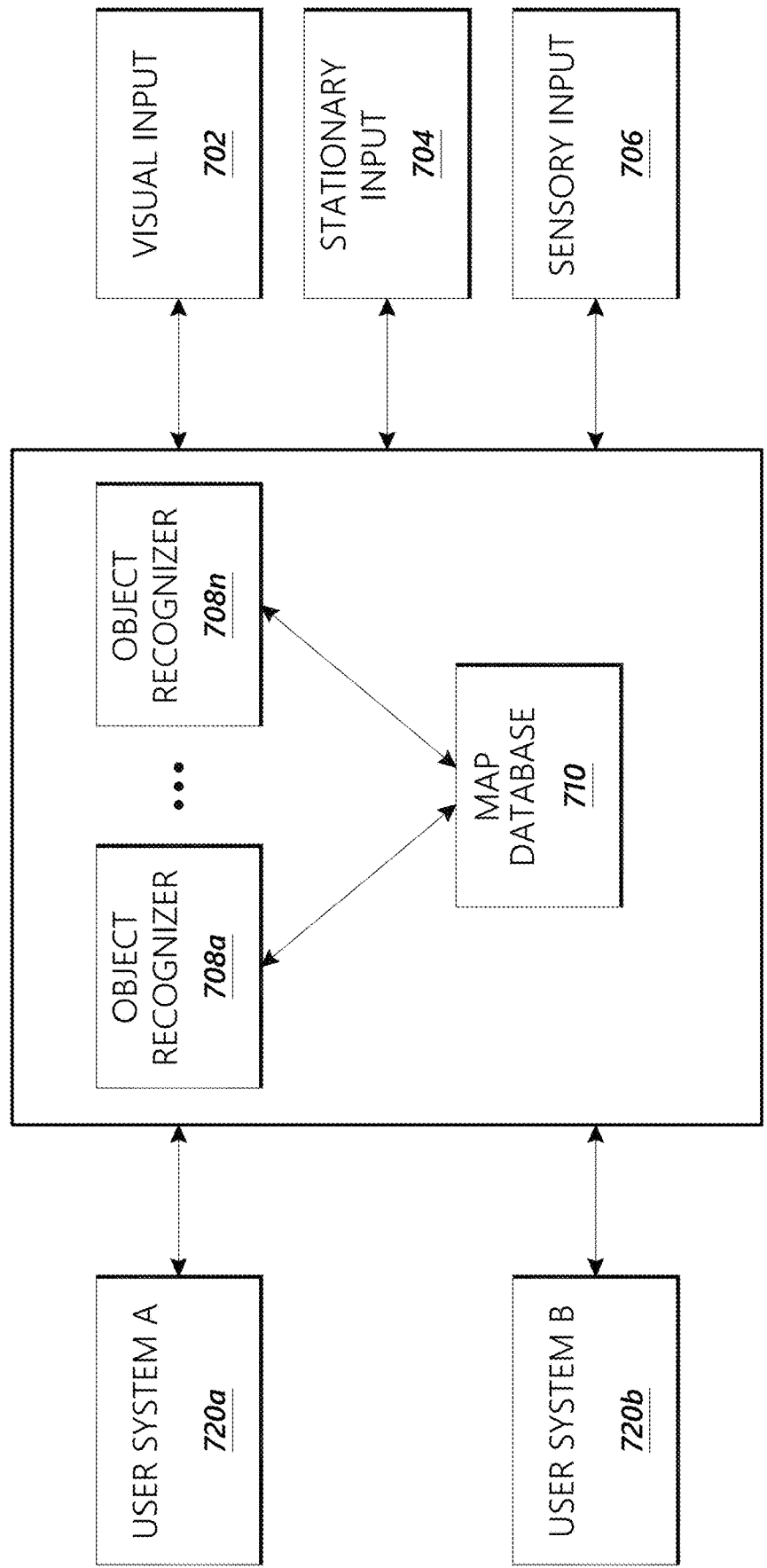
FIG. 7 is a block diagram of an example of a wearable system including various inputs into the wearable system.

FIG. 7 is a block diagram of an example of an MR environment 700. The MR environment 700 may be configured to receive input (e.g., visual input 702 from the user's wearable system, stationary input 704 such as room cameras, sensory input 706 from various sensors, gestures, totems, eye tracking, user input from the user input device 466 etc.) from one or more user wearable systems (e.g., wearable system 200 or display system 220) or stationary room systems (e.g., room cameras, etc.). The wearable systems can use various sensors (e.g., accelerometers, gyroscopes, temperature sensors, movement sensors, depth sensors, GPS sensors, inward-facing imaging system, outward-facing imaging system, etc.) to determine the location and various other attributes of the environment of the user. This information may further be supplemented with information from stationary cameras in the room that may provide images or various cues from a different point of view. The image data acquired by the cameras (such as the room cameras and/or the cameras of the outward-facing imaging system) may be reduced to a set of mapping points.

One or more object recognizers 708 can crawl through the received data (e.g., the collection of points) and recognize or map points, tag images, attach semantic information to objects with the help of a map database 710. The map database 710 may comprise various points collected over time and their corresponding objects. The various devices and the map database can be connected to each other through a network (e.g., LAN, WAN, etc.) to access the cloud.

Based on this information and collection of points in the map database, the object recognizers 708a to 708n may recognize objects in an environment. For example, the object recognizers can recognize faces, persons, windows, walls, user input devices, televisions, documents (e.g., travel tickets, driver's license, passport as described in the security examples herein), other objects in the user's environment, etc. One or more object recognizers may be specialized for object with certain characteristics. For example, the object recognizer 708a may be used to recognizer faces, while another object recognizer may be used recognize documents.

The object recognitions may be performed using a variety of computer vision techniques. For example, the wearable system can analyze the images acquired by the outward-facing imaging system 464 (shown in FIG. 4) to perform scene reconstruction, event detection, video tracking, object recognition (e.g., persons or documents), object pose estimation, facial recognition (e.g., from a person in the environment or an image on a document), learning, indexing, motion estimation, or image analysis (e.g., identifying indicia within documents such as photos, signatures, identification information, travel information, etc.), and so forth. One or more computer vision algorithms may be used to perform these tasks. Non-limiting examples of computer vision algorithms include: Scale-invariant feature transform (SIFT), speeded up robust features (SURF), oriented FAST and rotated BRIEF (ORB), binary robust invariant scalable keypoints (BRISK), fast retina keypoint (FREAK), Viola-Jones algorithm, Eigenfaces approach, Lucas-Kanade algorithm, Horn-Schunk algorithm, Mean-shift algorithm, visual simultaneous location and mapping (vSLAM) techniques, a sequential Bayesian estimator (e.g., Kalman filter, extended Kalman filter, etc.), bundle adjustment, Adaptive thresholding (and other thresholding techniques), Iterative Closest Point (ICP), Semi Global Matching (SGM), Semi Global Block Matching (SGBM), Feature Point Histograms, various machine learning algorithms (such as e.g., support vector machine, k-nearest neighbors algorithm, Naive Bayes, neural network (including convolutional or deep neural networks), or other supervised/unsupervised models, etc.), and so forth.

The object recognitions can additionally or alternatively be performed by a variety of machine learning algorithms. Once trained, the machine learning algorithm can be stored by the HMD. Some examples of machine learning algorithms can include supervised or non-supervised machine learning algorithms, including regression algorithms (such as, for example, Ordinary Least Squares Regression), instance-based algorithms (such as, for example, Learning Vector Quantization), decision tree algorithms (such as, for example, classification and regression trees), Bayesian algorithms (such as, for example, Naive Bayes), clustering algorithms (such as, for example, k-means clustering), association rule learning algorithms (such as, for example, a-priori algorithms), artificial neural network algorithms (such as, for example, Perceptron), deep learning algorithms (such as, for example, Deep Boltzmann Machine, or deep neural network), dimensionality reduction algorithms (such as, for example, Principal Component Analysis), ensemble algorithms (such as, for example, Stacked Generalization), and/or other machine learning algorithms. In some embodiments, individual models can be customized for individual data sets. For example, the wearable device can generate or store a base model. The base model may be used as a starting point to generate additional models specific to a data type (e.g., a particular user in the telepresence session), a data set (e.g., a set of additional images obtained of the user in the telepresence session), conditional situations, or other variations. In some embodiments, the wearable HMD can be configured to utilize a plurality of techniques to generate models for analysis of the aggregated data. Other techniques may include using pre-defined thresholds or data values.

Based on this information and collection of points in the map database, the object recognizers 708a to 708n may recognize objects and supplement objects with semantic information to give life to the objects. For example, if the object recognizer recognizes a set of points to be a door, the system may attach some semantic information (e.g., the door has a hinge and has a 90 degree movement about the hinge). If the object recognizer recognizes a set of points to be a mirror, the system may attach semantic information that the mirror has a reflective surface that can reflect images of objects in the room. The semantic information can include affordances of the objects as described herein. For example, the semantic information may include a normal of the object. The system can assign a vector whose direction indicates the normal of the object. Over time the map database grows as the system (which may reside locally or may be accessible through a wireless network) accumulates more data from the world. Once the objects are recognized, the information may be transmitted to one or more wearable systems. For example, the MR environment 700 may include information about a scene happening in California. The environment 700 may be transmitted to one or more users in New York. Based on data received from an FOV camera and other inputs, the object recognizers and other software components can map the points collected from the various images, recognize objects etc., such that the scene may be accurately "passed over" to a second user, who may be in a different part of the world. The environment 700 may also use a topological map for localization purposes.

Figure 8:
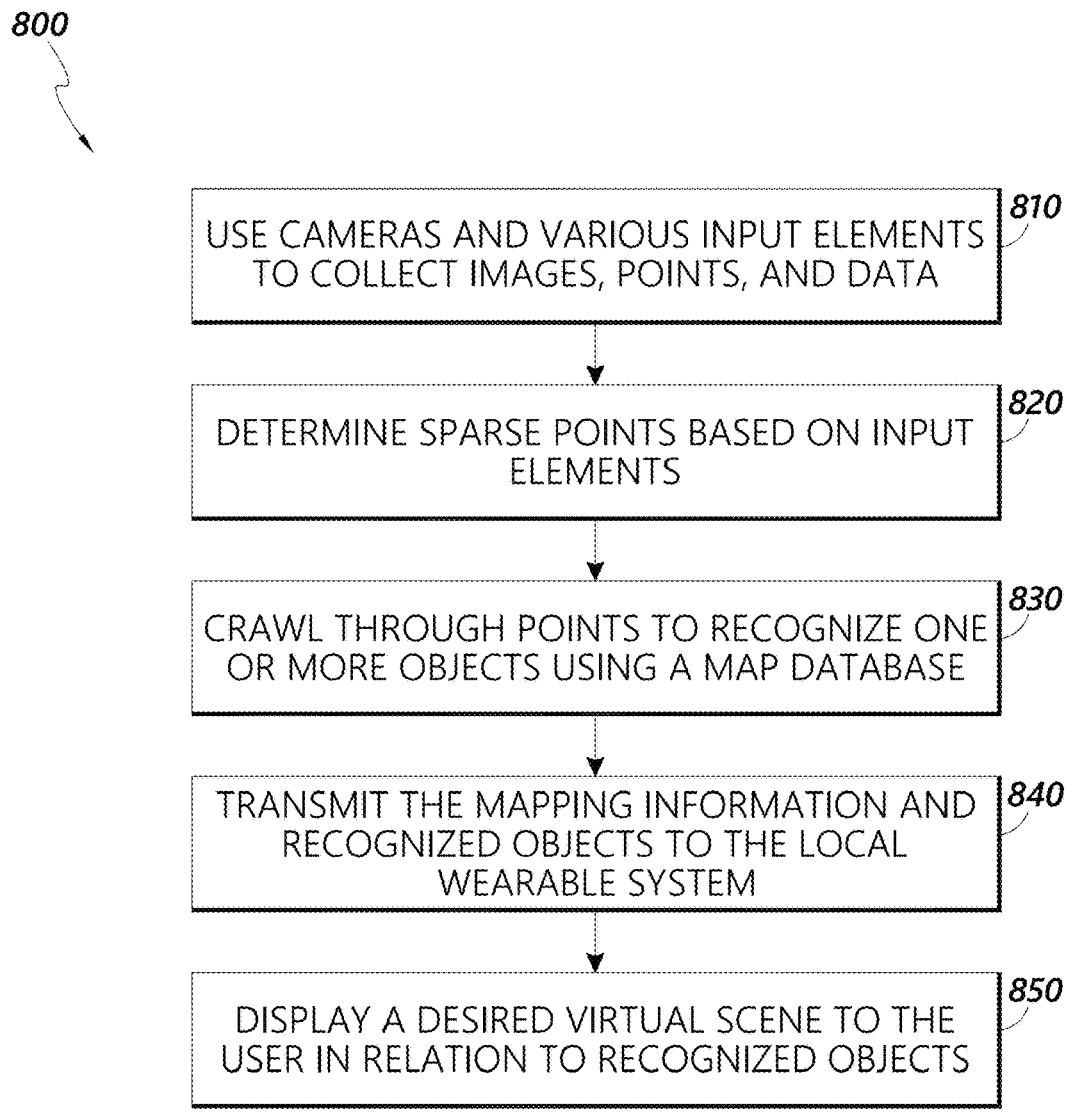
FIG. 8 is a process flow diagram of an example of a method of rendering virtual content in relation to recognized objects.

FIG. 8 is a process flow diagram of an example of a method 800 of rendering virtual content in relation to recognized objects. The method 800 describes how a virtual scene may be presented to a user of the wearable system. The user may be geographically remote from the scene. For example, the user may be in New York, but may want to view a scene that is presently going on in California, or may want to go on a walk with a friend who resides in California.

At block 810, the wearable system may receive input from the user and other users regarding the environment of the user. This may be achieved through various input devices, and knowledge already possessed in the map database. The user's FOV camera, sensors, GPS, eye tracking, etc., convey information to the system at block 810. The system may determine sparse points based on this information at block 820. The sparse points may be used in determining pose data (e.g., head pose, eye pose, body pose, or hand gestures) that can be used in displaying and understanding the orientation and position of various objects in the user's surroundings. The object recognizers 708a-708n may crawl through these collected points and recognize one or more objects using a map database at block 830. This information may then be conveyed to the user's individual wearable system at block 840, and the desired virtual scene may be accordingly displayed to the user at block 850. For example, the desired virtual scene (e.g., user in CA) may be displayed at the appropriate orientation, position, etc., in relation to the various objects and other surroundings of the user in New York.

Example Communications Among Multiple Wearable Systems

Figure 9A:
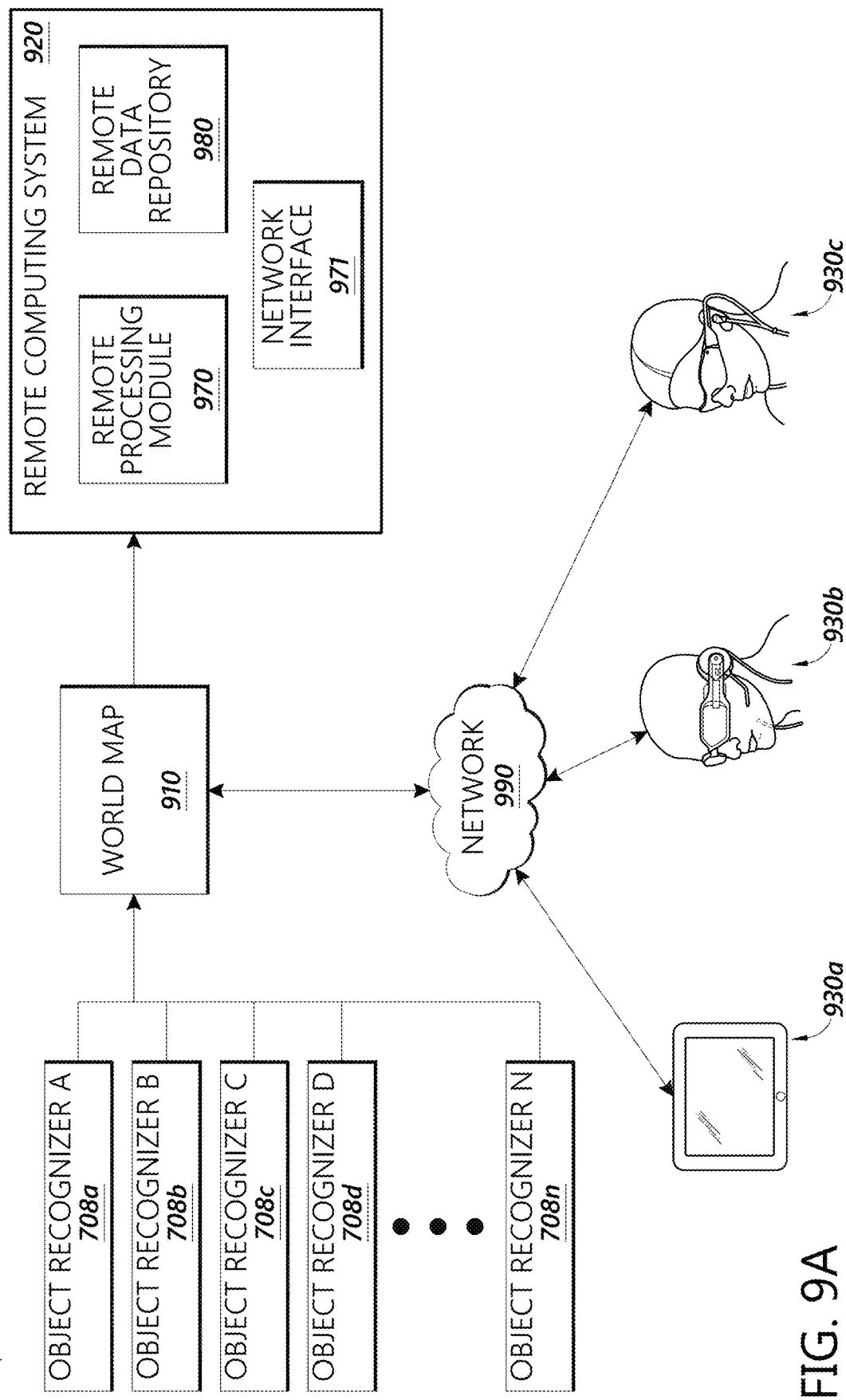
FIG. 9A schematically illustrates an overall system view depicting multiple wearable systems interacting with each other.

FIG. 9A schematically illustrates an overall system view depicting multiple user devices interacting with each other. The computing environment 900 includes user devices 930a, 930b, 930c. The user devices 930a, 930b, and 930c can communicate with each other through a network 990. The user devices 930a-930c can each include a network interface to communicate via the network 990 with a remote computing system 920 (which may also include a network interface 971). The network 990 may be a LAN, WAN, peer-to-peer network, radio, Bluetooth, or any other network. The computing environment 900 can also include one or more remote computing systems 920. The remote computing system 920 may include server computer systems that are clustered and located at different geographic locations. The user devices 930a, 930b, and 930c may communicate with the remote computing system 920 via the network 990.

The remote computing system 920 may include a remote data repository 980 which can maintain information about a specific user's physical and/or virtual worlds. Data storage 980 can store information related to users, users' environment (e.g., world maps of the user's environment), or configurations of avatars of the users. The remote data repository may be an embodiment of the remote data repository 280 shown in FIG. 2. The remote computing system 920 may also include a remote processing module 970. The remote processing module 970 may be an embodiment of the remote processing module 270 shown in FIG. 2. The remote processing module 970 may include one or more processors which can communicate with the user devices (930a, 930b, 930c) and the remote data repository 980. The processors can process information obtained from user devices and other sources. In some implementations, at least a portion of the processing or storage can be provided by the local processing and data module 260 (as shown in FIG. 2). The remote computing system 920 may enable a given user to share information about the specific user's own physical and/or virtual worlds with another user.

The user device may be a wearable device (such as an HMD or an ARD), a computer, a mobile device, or any other devices alone or in combination. For example, the user devices 930b and 930c may be an embodiment of the wearable system 200 shown in FIG. 2 (or the wearable system 400 shown in FIG. 4) which can be configured to present AR/VR/MR content.

One or more of the user devices can be used with the user input device 466 shown in FIG. 4. A user device can obtain information about the user and the user's environment (e.g., using the outward-facing imaging system 464 shown in FIG. 4). The user device and/or remote computing system 1220 can construct, update, and build a collection of images, points and other information using the information obtained from the user devices. For example, the user device may process raw information acquired and send the processed information to the remote computing system 1220 for further processing. The user device may also send the raw information to the remote computing system 1220 for processing. The user device may receive the processed information from the remote computing system 1220 and provide final processing before projecting to the user. The user device may also process the information obtained and pass the processed information to other user devices. The user device may communicate with the remote data repository 1280 while processing acquired information. Multiple user devices and/or multiple server computer systems may participate in the construction and/or processing of acquired images.

The information on the physical worlds may be developed over time and may be based on the information collected by different user devices. Models of virtual worlds may also be developed over time and be based on the inputs of different users. Such information and models can sometimes be referred to herein as a world map or a world model. As described with reference to FIGS. 6 and 7, information acquired by the user devices may be used to construct a world map 910. The world map 910 may include at least a portion of the map 620 described in FIG. 6A. Various object recognizers (e.g. 708a, 708b, 708c . . . 708n) may be used to recognize objects and tag images, as well as to attach semantic information to the objects. These object recognizers are also described in FIG. 7.

The remote data repository 980 can be used to store data and to facilitate the construction of the world map 910. The user device can constantly update information about the user's environment and receive information about the world map 910. The world map 910 may be created by the user or by someone else. As discussed herein, user devices (e.g. 930a, 930b, 930c) and remote computing system 920, alone or in combination, may construct and/or update the world map 910. For example, a user device may be in communication with the remote processing module 970 and the remote data repository 980. The user device may acquire and/or process information about the user and the user's environment. The remote processing module 970 may be in communication with the remote data repository 980 and user devices (e.g. 930a, 930b, 930c) to process information about the user and the user's environment. The remote computing system 920 can modify the information acquired by the user devices (e.g. 930a, 930b, 930c), such as, e.g. selectively cropping a user's image, modifying the user's background, adding virtual objects to the user's environment, annotating a user's speech with auxiliary information, etc. The remote computing system 920 can send the processed information to the same and/or different user devices.

Examples of a Telepresence Session

Figure 9B:
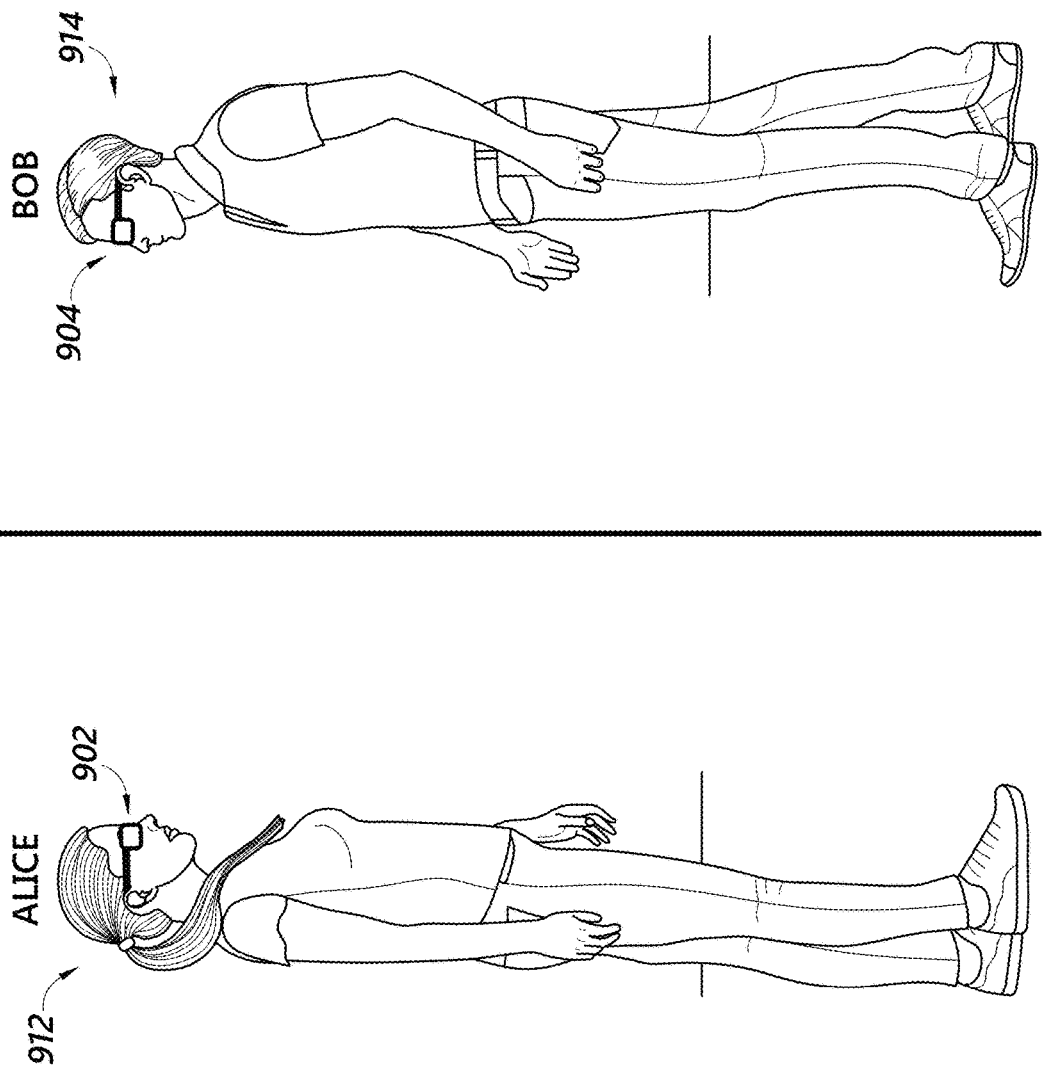
FIG. 9B illustrates an example telepresence session.

FIG. 9B depicts an example where two users of respective wearable systems are conducting a telepresence session. Two users (named Alice 912 and Bob 914 in this example) are shown in this figure. The two users are wearing their respective wearable devices 902 and 904 which can include an HMD described with reference to FIG. 2 (e.g., the display device 220 of the system 200) for representing a virtual avatar of the other user in the telepresence session. The two users can conduct a telepresence session using the wearable device. Note that the vertical line in FIG. 9B separating the two users is intended to illustrate that Alice 912 and Bob 914 may (but need not) be in two different locations while they communicate via telepresence (e.g., Alice may be inside her office in Atlanta while Bob is outdoors in Boston).

As described with reference to FIG. 9A, the wearable devices 902 and 904 may be in communication with each other or with other user devices and computer systems. For example, Alice's wearable device 902 may be in communication with Bob's wearable device 904, e.g., via the network 990 (shown in FIG. 9A). The wearable devices 902 and 904 can track the users' environments and movements in the environments (e.g., via the respective outward-facing imaging system 464, or one or more location sensors) and speech (e.g., via the respective audio sensor 232). The wearable devices 902 and 904 can also track the users' eye movements or gaze based on data acquired by the inward-facing imaging system 462. In some situations, the wearable device can also capture or track a user's facial expressions or other body movements (e.g., arm or leg movements) where a user is near a reflective surface and the outward-facing imaging system 464 can obtain reflected images of the user to observe the user's facial expressions or other body movements.

A wearable device can use information acquired of a first user and the environment to animate a virtual avatar that will be rendered by a second user's wearable device to create a tangible sense of presence of the first user in the second user's environment. For example, the wearable devices 902 and 904, the remote computing system 920, alone or in combination, may process Alice's images or movements for presentation by Bob's wearable device 904 or may process Bob's images or movements for presentation by Alice's wearable device 902. As further described herein, the avatars can be rendered based on contextual information such as, e.g., a user's intent, an environment of the user or an environment in which the avatar is rendered, or other biological features of a human.

Although the examples only refer to two users, the techniques described herein should not be limited to two users. Multiple users (e.g., two, three, four, five, six, or more) using wearables (or other telepresence devices) may participate in a telepresence session. A particular user's wearable device can present to that particular user the avatars of the other users during the telepresence session. Further, while the examples in this figure show users as standing in an environment, the users are not required to stand. Any of the users may stand, sit, kneel, lie down, walk or run, or be in any position or movement during a telepresence session. The user may also be in a physical environment other than described in examples herein. The users may be in separate environments or may be in the same environment while conducting the telepresence session. Not all users are required to wear their respective HMDs in the telepresence session. For example, Alice 912 may use other image acquisition and display devices such as a webcam and computer screen while Bob 914 wears the wearable device 904.

Examples of a Virtual Avatar

Figure 10:
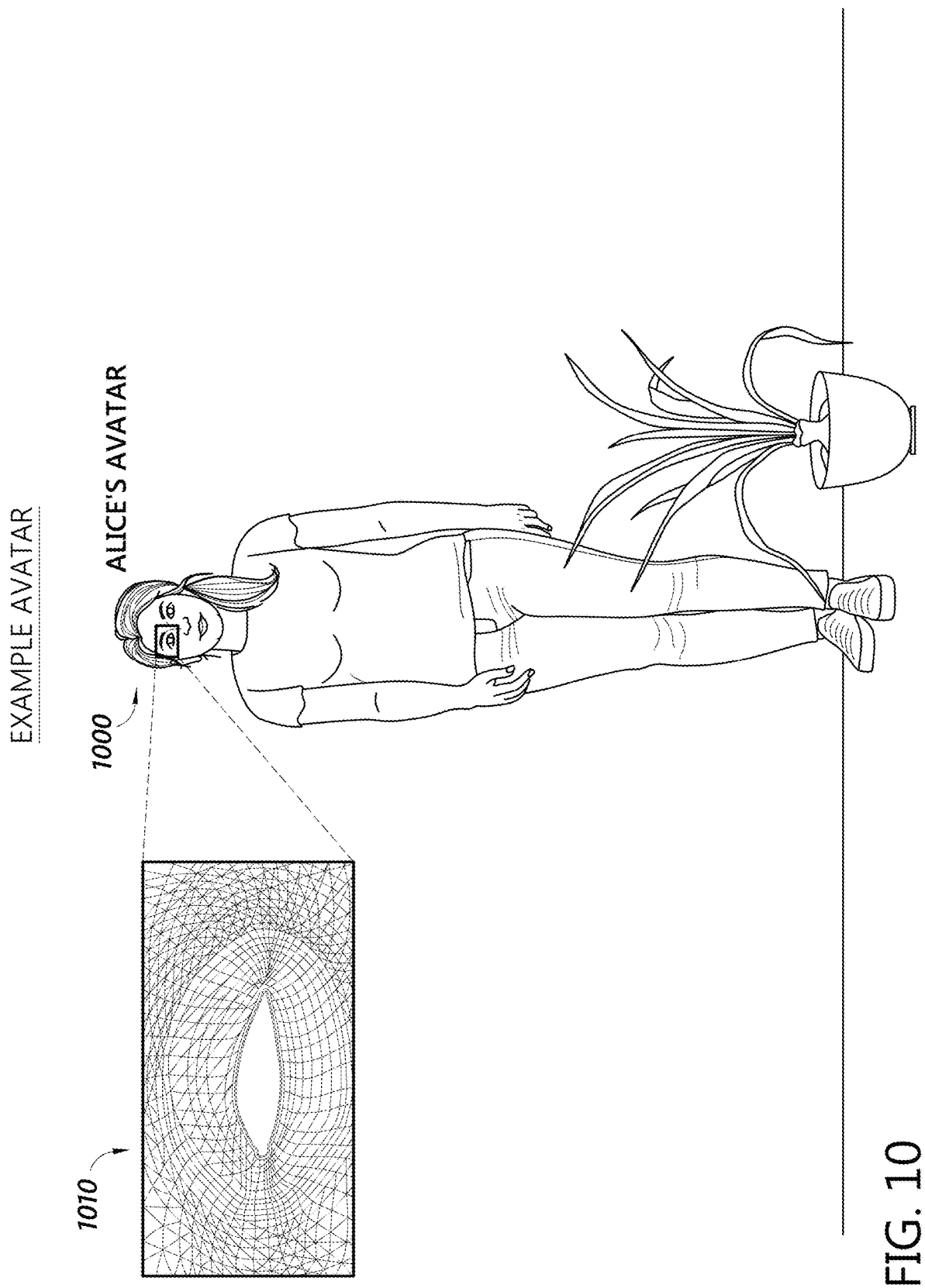
FIG. 10 illustrates an example of an avatar as perceived by a user of a wearable system.

FIG. 10 illustrates an example of an avatar as perceived by a user of a wearable system. The example avatar 1000 shown in FIG. 10 can be an avatar of Alice 912 (shown in FIG. 9B) standing behind a physical plant in a room. An avatar can include various characteristics, such as for example, size, appearance (e.g., skin color, complexion, hair style, clothes, facial features, such as wrinkles, moles, blemishes, pimples, dimples, etc.), position, orientation, movement, pose, expression, etc. These characteristics may be based on the user associated with the avatar (e.g., the avatar 1000 of Alice may have some or all characteristics of the actual person Alice 912). As further described herein, the avatar 1000 can be animated based on contextual information, which can include adjustments to one or more of the characteristics of the avatar 1000. Although generally described herein as representing the physical appearance of the person (e.g., Alice), this is for illustration and not limitation. Alice's avatar could represent the appearance of another real or fictional human being besides Alice, a personified object, a creature, or any other real or fictitious representation. Further, the plant in FIG. 10 need not be physical, but could be a virtual representation of a plant that is presented to the user by the wearable system. Also, additional or different virtual content than shown in FIG. 10 could be presented to the user.

Examples of Rigging Systems for Virtual Characters

An animated virtual character, such as a human avatar, can be wholly or partially represented in computer graphics as a polygon mesh. A polygon mesh, or simply "mesh" for short, is a collection of points in a modeled three-dimensional space. The mesh can form a polyhedral object whose surfaces define the body or shape of the virtual character (or a portion thereof). While meshes can include any number of points (within practical limits which may be imposed by available computing power), finer meshes with more points are generally able to portray more realistic virtual characters with finer details that may closely approximate real life people, animals, objects, etc. FIG. 10 shows an example of a mesh 1010 around an eye of the avatar 1000. While meshes can include any number of points (within practical limits which may be imposed by available computing power), finer meshes with more points are generally able to portray more realistic virtual characters with finer details that may closely approximate real life people, animals, objects, etc. FIG. 10 shows an example of a mesh 1010 around an eye of the avatar 1000. The mesh 1010 may be relatively fine (e.g., have a relatively large number of points), to facilitate a high quality simulation of the complex curves and movements that occur in the eye region.

Each point in the mesh can be defined by a coordinate in the modeled three-dimensional space. The modeled three-dimensional space can be, for example, a Cartesian space addressed by (x, y, z) coordinates. The points in the mesh are the vertices of the polygons which make up the polyhedral object. Each polygon represents a surface, or face, of the polyhedral object and is defined by an ordered set of vertices, with the sides of each polygon being straight line edges connecting the ordered set of vertices. In some cases, the polygon vertices in a mesh may differ from geometric polygons in that they are not necessarily coplanar in 3D graphics. In addition, the vertices of a polygon in a mesh may be collinear, in which case the polygon has zero area (referred to as a degenerate polygon).

In some embodiments, a mesh is made up of three-vertex polygons (i.e., triangles or "tris" for short) or four-vertex polygons (i.e., quadrilaterals or "quads" for short). However, higher-order polygons can also be used in some meshes. Meshes are typically quad-based in direct content creation (DCC) applications (e.g., applications such as Maya (available from Autodesk, Inc.) or Houdini (available from Side Effects Software Inc.) which are primarily designed for creating and manipulating 3D computer graphics), whereas meshes are typically tri-based in real-time applications.

To animate a virtual character, its mesh can be deformed by moving some or all of its vertices to new positions in space at various instants in time. The deformations can represent both large-scale movements (e.g., movement of limbs) and fine movements (e.g., facial movements). These and other deformations can be based on real-world models (e.g., photogrammetric scans of real humans performing body movements, articulations, facial contortions, expressions, etc.), art-directed development (which may be based on real-world sampling), combinations of the same, or other techniques. In the early days of computer graphics, mesh deformations could be accomplished manually by independently setting new positions for the vertices, but given the size and complexity of modern meshes it is typically desirable to produce deformations using automated systems and processes. The control systems, processes, and techniques for producing these deformations are referred to as rigging, or simply "the rig." The example avatar processing and rendering system 690 of FIG. 6B includes a 3D model processing system 680 which can implement rigging.

The rigging for a virtual character can use skeletal systems to assist with mesh deformations. A skeletal system includes a collection of joints which correspond to points of articulation for the mesh. In the context of rigging, joints are sometimes also referred to as "bones" despite the difference between these terms when used in the anatomical sense. Joints in a skeletal system can move, or otherwise change, with respect to one another according to transforms which can be applied to the joints. The transforms can include translations or rotations in space, as well as other operations. The joints can be assigned hierarchical relationships (e.g., parent-child relationships) with respect to one another. These hierarchical relationships can allow one joint to inherit transforms or other characteristics from another joint. For example, a child joint in a skeletal system can inherit a transform assigned to its parent joint so as to cause the child joint to move together with the parent joint.

A skeletal system for a virtual character can be defined with joints at appropriate positions, and with appropriate local axes of rotation, degrees of freedom, etc., to allow for a desired set of mesh deformations to be carried out. Once a skeletal system has been defined for a virtual character, each joint can be assigned, in a process called "skinning," an amount of influence over the various vertices in the mesh. This can be done by assigning a weight value to each vertex for each joint in the skeletal system. When a transform is applied to any given joint, the vertices under its influence can be moved, or otherwise altered, automatically based on that joint transform by amounts which can be dependent upon their respective weight values.

Figure 11A:
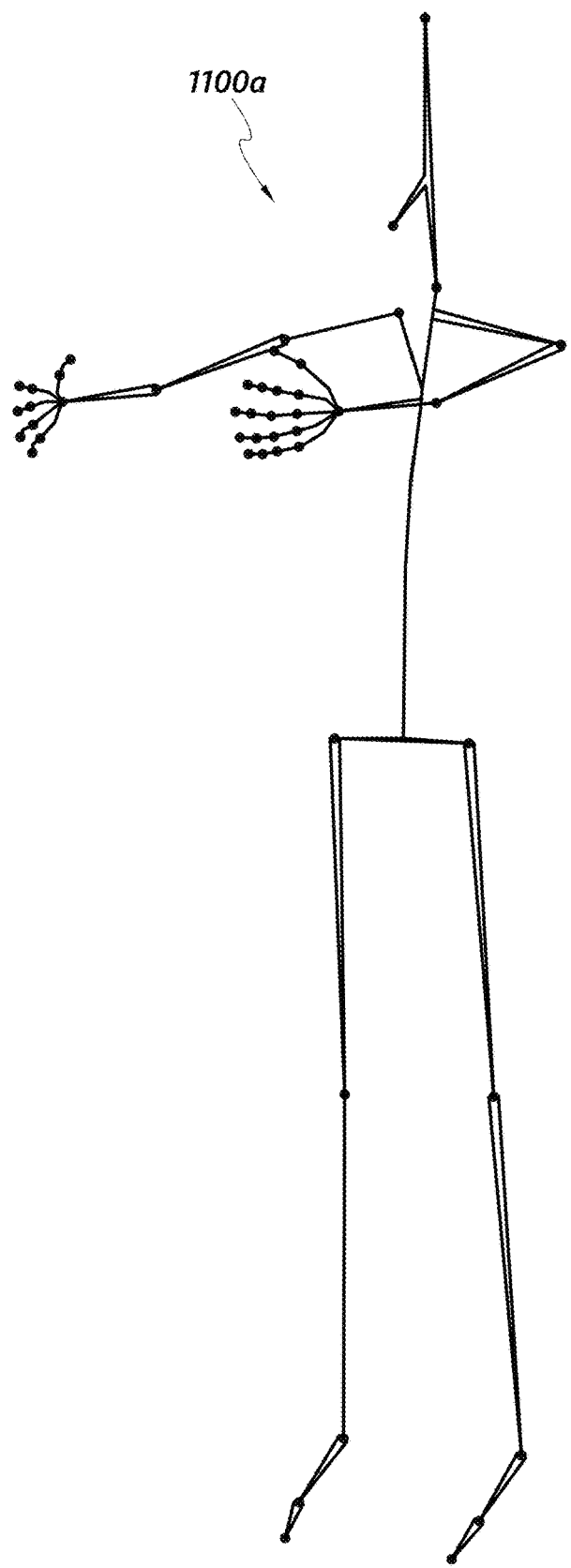
FIG. 11A illustrates an example of a low order, core (or base) skeleton. A higher order skeleton can be added to the low order, core skeleton (see, e.g., the example shown in FIG. 11B).
Figure 11B:
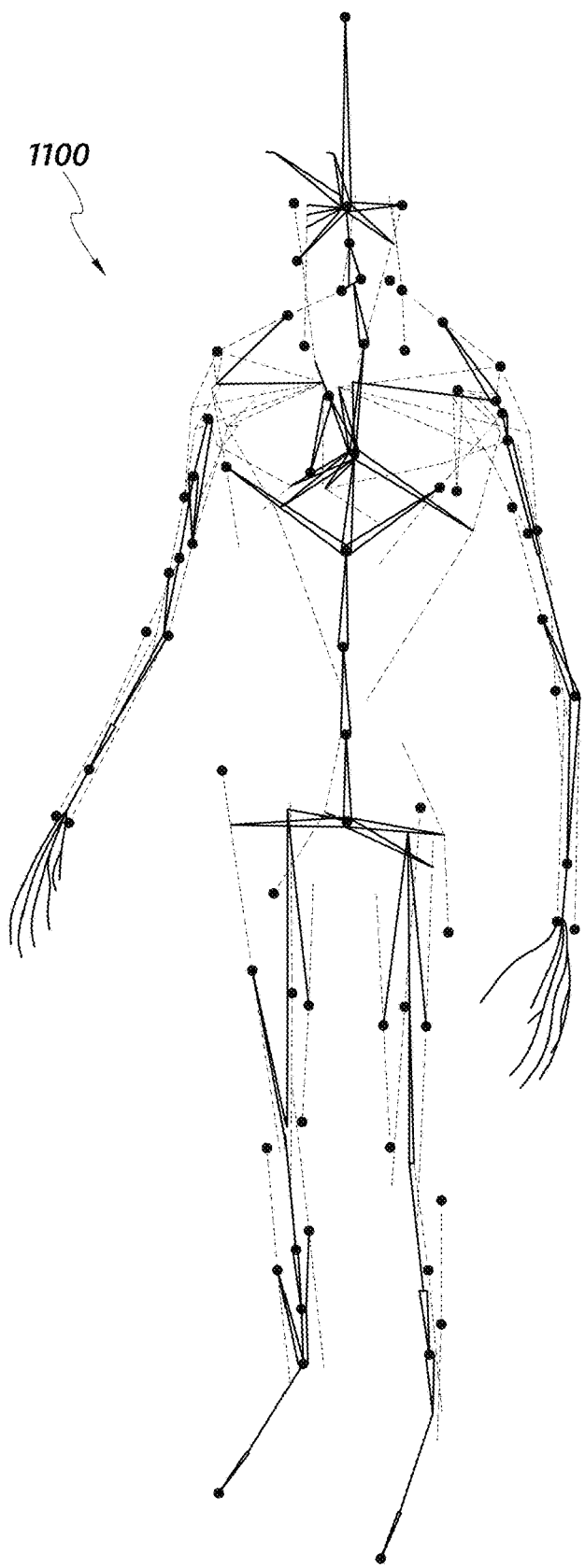
FIG. 11B illustrates an example of a skeleton for animating an avatar. The skeleton includes a core (or base) skeleton (shown in solid lines) with higher order biomechanical linkages (shown in dashed lines) among a hierarchical set of interconnected joints.

A rig can include multiple skeletal systems. One type of skeletal system is a core skeleton (also referred to as a low-order skeleton) which can be used to control large-scale movements of the virtual character. FIG. 11A illustrates an example of a low order, core skeleton 1100a. In the case of a human avatar, for example, the core skeleton might resemble the anatomical skeleton of a human. Although the core skeleton for rigging purposes may not map exactly to an anatomically-correct skeleton, it may have a sub-set of joints in analogous locations with analogous orientations and movement properties. Higher order joints and biomechanical linkages can be added to the core skeleton 1100a to build up a skeleton that can perform more animation functions. FIG. 11B illustrates an example of a skeletal system 1100, with the core skeleton shown in solid lines, and higher order joints shown in dashed lines.

As briefly mentioned above, a skeletal system of joints can be hierarchical with, for example, parent-child relationships among joints. When a transform (e.g., a change in position and/or orientation) is applied to a particular joint in the skeletal system, the same transform can be applied to all other lower-level joints within the same hierarchy. In the case of a rig for a human avatar, for example, the core skeleton may include separate joints for the avatar's shoulder, elbow, and wrist. Among these, the shoulder joint may be assigned to the highest level in the hierarchy, while the elbow joint can be assigned as a child of the shoulder joint, and the wrist joint can be assigned as a child of the elbow joint. Accordingly, when a particular translation and/or rotation transform is applied to the shoulder joint, the same transform can also be applied to the elbow joint and the wrist joint such that they are translated and/or rotated in the same way as the shoulder.

Despite the connotations of its name, a skeletal system in a rig need not necessarily represent an anatomical skeleton. In rigging, skeletal systems can represent a wide variety of hierarchies used to control deformations of the mesh. For example, hair can be represented as a series of joints in a hierarchical chain; skin motions due to an avatar's facial contortions (which may represent expressions such as smiling, frowning, laughing, speaking, blinking, etc.) can be represented by a series of facial joints controlled by a facial rig; muscle deformation can be modeled by joints; and motion of clothing can be represented by a grid of joints.

The rig for a virtual character can include multiple skeletal systems, some of which may drive the movement of others. A lower-order skeletal system is one which drives one or more higher-order skeletal systems. Conversely, higher-order skeletal systems are ones which are driven or controlled by a lower-order skeletal system. For example, whereas the movements of the core skeleton of a character might be controlled manually by an animator, the core skeleton can in turn drive or control the movements of a higher-order skeletal system. For example, higher-order helper joints—which may not have anatomical analogs in a physical skeleton—can be provided to improve the mesh deformations which result from movements of the core skeleton. The transforms applied to these and other joints in higher-order skeletal systems may be derived algorithmically from the transforms applied to the lower-order skeleton. Higher-order skeletons can represent, for example, muscles, skin, fat, clothing, hair, or any other skeletal system which does not require direct animation control.

As already discussed, transforms can be applied to joints in skeletal systems in order to carry out mesh deformations. In the context of rigging, transforms include functions which accept one or more given points in 3D space and produce an output of one or more new 3D points. For example, a transform can accept one or more 3D points which define a joint and can output one or more new 3D points which specify the transformed joint. Joint transforms can include, for example, a translation component, a rotation component, and a scale component.

A translation is a transform which moves a set of one or more specified points in the modeled 3D space by a specified amount with no change in the orientation or size of the set of points. A rotation is a transform which rotates a set of one or more specified points in the modeled 3D space about a specified axis by a specified amount (e.g., rotate every point in the mesh 45 degrees about the z-axis). An affine transform (or 6 degree of freedom (DOF) transform) is one which only includes translation(s) and rotation(s). Application of an affine transform can be thought of as moving a set of one or more points in space without changing its size, though the orientation can change.

Meanwhile, a scale transform is one which modifies one or more specified points in the modeled 3D space by scaling their respective coordinates by a specified value. This changes the size and/or shape of the transformed set of points. A uniform scale transform scales each coordinate by the same amount, whereas a non-uniform scale transform can scale the (x, y, z) coordinates of the specified points independently. A non-uniform scale transform can be used, for example, to provide squashing and stretching effects, such as those which may result from muscular action. Yet another type of transform is a shear transform. A shear transform is one which modifies a set of one or more specified points in the modeled 3D space by translating a coordinate of the points by different amounts based on the distance of that coordinate from an axis.

When a transform is applied to a joint to cause it to move, the vertices under the influence of that joint are also moved. This results in deformations of the mesh. As discussed above, the process of assigning weights to quantify the influence each joint has over each vertex is called skinning (or sometimes "weight painting" or "skin weighting"). The weights are typically values between 0 (meaning no influence) and 1 (meaning complete influence). Some vertices in the mesh may be influenced only by a single joint. In that case those vertices are assigned weight values of 1 for that joint, and their positions are changed based on transforms assigned to that specific joint but no others. Other vertices in the mesh may be influenced by multiple joints. In that case, separate weights are assigned to those vertices for all of the influencing joints, with the sum of the weights for each vertex equaling 1. The positions of these vertices are changed based on transforms assigned to all of their influencing joints.

Making weight assignments for all of the vertices in a mesh can be extremely labor intensive, especially as the number of joints increases. Balancing the weights to achieve desired mesh deformations in response to transforms applied to the joints can be quite difficult for even highly trained artists. In the case of real-time applications, the task can be complicated further by the fact that many real-time systems also enforce limits on the number of joints (generally 8 or fewer) which can be weighted to a specific vertex. Such limits are typically imposed for the sake of efficiency in the graphics processing unit (GPU).

The term skinning also refers to the process of actually deforming the mesh, using the assigned weights, based on transforms applied to the joints in a skeletal system. For example, a series of core skeleton joint transforms may be specified by an animator to produce a desired character movement (e.g., a running movement or a dance step). When transforms are applied to one or more of the joints, new positions are calculated for the vertices under the influence of the transformed joints. The new position for any given vertex is typically computed as a weighted average of all the joint transforms which influence that particular vertex. There are many algorithms used for computing this weighted average, but the most common, and the one used in most real-time applications due to its simplicity and ease of control, is linear blend skinning (LBS). In linear blend skinning, a new position for each vertex is calculated using each joint transform for which that vertex has a non-zero weight. Then, the new vertex coordinates resulting from each of these joint transforms are summed in proportion to the respective weights assigned to that vertex for each of the joints. There are well known limitations to LBS in practice, and much of the work in making high-quality rigs (e.g., for movies) is devoted to finding and overcoming these limitations. Many helper joint systems are designed specifically for this purpose.

In addition to skeletal systems, "blendshapes" can also be used in rigging to produce mesh deformations. A blendshape (sometimes also called a "morph target" or just a "shape") is a deformation applied to a set of vertices in the mesh where each vertex in the set is moved a specified amount in a specified direction based upon a weight. Each vertex in the set may have its own custom motion for a specific blendshape, and moving the vertices in the set simultaneously will generate the desired shape. The custom motion for each vertex in a blendshape can be specified by a "delta," which is a vector representing the amount and direction of XYZ motion applied to that vertex. Blendshapes can be used to produce, for example, facial deformations to move the eyes, lips, brows, nose, dimples, etc., just to name a few possibilities.

Blendshapes are useful for deforming the mesh in an art-directable way. They offer a great deal of control, as the exact shape can be sculpted or captured from a scan of a model. But the benefits of blendshapes come at the cost of having to store the deltas for all the vertices in the blendshape. For animated characters with fine meshes and many blendshapes, the amount of delta data can be significant.

Each blendshape can be applied to a specified degree by using blendshape weights. These weights typically range from 0 (where the blendshape is not applied at all) to 1 (where the blendshape is fully active). For example, a blendshape to move a character's eyes can be applied with a small weight to move the eyes a small amount, or it can be applied with a large weight to create a larger eye movement.

The rig may apply multiple blendshapes in combinations with one another to achieve a desired complex deformation. For example, to produce a smile, the rig may apply blendshapes for lip corner pull, raising the upper lip, and lowering the lower lip, as well as moving the eyes, brows, nose, and dimples. The desired shape from combining two or more blendshapes is known as a combination shape (or simply a "combo").

One problem that can result from applying two blendshapes in combination is that the blendshapes may operate on some of the same vertices. When both blendshapes are active, the result is called a double transform or "going off-model." The solution to this is typically a corrective blendshape. A corrective blendshape is a special blendshape which represents a desired deformation with respect to a currently applied deformation rather than representing a desired deformation with respect to the neutral. Corrective blendshapes (or just "correctives") can be applied based upon the weights of the blendshapes they are correcting. For example, the weight for the corrective blendshape can be made proportionate to the weights of the underlying blendshapes which trigger application of the corrective blendshape.

Corrective blendshapes can also be used to correct skinning anomalies or to improve the quality of a deformation. For example, a joint may represent the motion of a specific muscle, but as a single transform it cannot represent all the non-linear behaviors of the skin, fat, and muscle. Applying a corrective, or a series of correctives, as the muscle activates can result in more pleasing and convincing deformations.

Rigs are built in layers, with lower, simpler layers often driving higher-order layers. This applies to both skeletal systems and blendshape deformations. For example, as already mentioned, the rigging for an animated virtual character may include higher-order skeletal systems which are controlled by lower-order skeletal systems. There are many ways to control a higher-order skeleton or a blendshape based upon a lower-order skeleton, including constraints, logic systems, and pose-based deformation.

A constraint is typically a system where a particular object or joint transform controls one or more components of a transform applied to another joint or object. There are many different types of constraints. For example, aim constraints change the rotation of the target transform to point in specific directions or at specific objects. Parent constraints act as virtual parent-child relationships between pairs of transforms. Position constraints constrain a transform to specific points or a specific object. Orientation constraints constrain a transform to a specific rotation of an object. Additional discussion of constraints that can be used in embodiments of the disclosed joint decompositions is provided below.

Logic systems are systems of mathematical equations which produce some outputs given a set of inputs. These are specified, not learned. For example, a blendshape value might be defined as the product of two other blendshapes (this is an example of a corrective shape known as a combination or combo shape).

Pose-based deformations can also be used to control higher-order skeletal systems or blendshapes. The pose of a skeletal system is defined by the collection of transforms (e.g., rotation(s) and translation(s)) for all the joints in that skeletal system. Poses can also be defined for subsets of the joints in a skeletal system. For example, an arm pose could be defined by the transforms applied to the shoulder, elbow, and wrist joints. A pose space deformer (PSD) is a system used to determine a deformation output for a particular pose based on one or more "distances" between that pose and a defined pose. These distances can be metrics which characterize how different one of the poses is from the other. A PSD can include a pose interpolation node which, for example, accepts a set of joint rotations (defining a pose) as input parameters and in turn outputs normalized per-pose weights to drive a deformer, such as a blendshape. The pose interpolation node can be implemented in a variety of ways, including with radial basis functions (RBFs). RBFs can perform a machine-learned mathematical approximation of a function. RBFs can be trained using a set of inputs and their associated expected outputs. The training data could be, for example, multiple sets of joint transforms (which define particular poses) and the corresponding blendshapes (or linear skins) to be applied in response to those poses. Once the function is learned, new inputs (e.g., poses) can be given and their expected outputs can be computed efficiently. RBFs are a subtype of artificial neural networks. RBFs can be used to drive higher-level components of a rig based upon the state of lower-level components. For example, the pose of a core skeleton can drive helper joints and correctives at higher levels.

These control systems can be chained together to perform complex behaviors. As an example, an eye rig could contain two "look around" values for horizontal and vertical rotation. These values can be passed through some logic to determine the exact rotation of an eye joint transform, which might in turn be used as an input to an RBF which controls blendshapes that change the shape of the eyelid to match the position of the eye. The activation values of these shapes might be used to drive other components of a facial expression using additional logic, and so on.

A goal of rigging systems is typically to provide a mechanism to produce pleasing, high-fidelity deformations based on simple, human-understandable control systems. In the case of real-time applications, the goal is typically to provide rigging systems which are simple enough to run in real-time on, for example, a VR/AR/MR system 200, while making as few compromises to the final quality as possible. In some embodiments, the 3D model processing system 680 executes a rigging system to animate an avatar in a mixed reality environment 100 in real-time to be interactive (with users of the VR/AR/MR system) and to provide appropriate, contextual avatar behavior (e.g., intent-based behavior) in the user's environment.

Introduction to Skeletal Systems for Geometric Deformation of a Virtual Avatar

As discussed herein, rigging includes techniques for transferring information about deformation of the body of an avatar (e.g., facial contortions, arm movements, leg movements, torso movements, head rotations and tilts, hand movements including grasping and pointing, etc.) onto a mesh of vertices. Animating a mesh (e.g., animating an avatar) may include deforming a mesh by moving some or all of the vertices that form the mesh to new positions in 3D space. The example avatar processing and rendering system 690 of FIG. 6B includes a 3D model processing system 680, which can implement a rig (e.g., a control system for deforming the mesh and animating an avatar). As a mesh may include large numbers of vertices, rigs typically provide common, desirable deformations as computerized commands that make it easier to control the mesh.

For high-end visual effects productions such as movies, there may be sufficient production time for rigs to perform massive mathematical computations to achieve highly realistic animation effects—in other words, this context typically prioritizes high-quality at the expense of high-speed.

But for real-time applications (such as in mixed reality), deformation speed can be very advantageous and different rigging techniques may be used—in other words, this context typically prioritizes high-speed at the expense of high-quality. Rigs often utilize deformations that rely on skeletal systems, linear blend skinning, or optionally blendshapes. Techniques to generate parameters the rig can use for avatar skinning transformations are described below.

Linear blend skinning (LBS) is a common technique for animating digital puppets, where a mesh (or other geometric object) is deformed based upon a driving skeleton made up of a hierarchy of joint transforms. FIG. 11B illustrates an example of a skeleton 1100 having a hierarchical order of joints. A mesh (comprising, for example, polyhedral vertices) can overly the skeleton and can be used to represent the skin or clothes of an avatar or a deformable surface of another virtual object.

A relationship between the skeletal joints and a base (neutral) pose of that skeleton can be used to define an association between each vertex of the mesh and each of the joints in the skeleton. For a new pose of the skeleton, the deformed mesh (representing the new pose) can be calculated by determining a relative transformation (e.g., a rotation and a translation) of each of the joints from their base pose to the new pose. Not every joint has an influence on every vertex. For example, movement of the left leg of the avatar typically will not cause any movement of the right hand of the avatar. However, movement of the right forearm of the avatar typically will cause movement of the right hand of the avatar. A weight map comprising a set of weights for every joint and every vertex can be used to measure the amount of influence of any joint on any vertex. If the joint does not influence a vertex, the associated weight is zero.

For each joint, the joint's relative transformation is applied to each vertex that has a non-zero weight for that joint and the new vertex coordinates are stored. The final vertex position for all the vertices is the weighted sum of the transformed vertex positions for each of the joints for which a joint has a non-zero weight. Therefore, when the skeleton moves, the rig can move the mesh vertices (e.g., representing skin or clothes overlying the skeleton) via the LBS skinning parameters. Additional technical details of LBS are described below.

One potential difficulty in LBS, or in any direct skinning method, is determining the weight maps for each joint. In practice, these are often set by hand in a process known as weight painting. This is time- and labor-intensive and prone to user error. Complexity increases as the number of joints affecting a given region of the mesh increases. In addition, in real-time applications, there are often hard limits to the maximum number of joints that can affect a specific piece of geometry which in-turn requires careful evaluation and trade-offs to achieve high quality under strict real-time limits.

In some cases, LBS tends to be a relatively low quality way to deform mesh, so blendshapes are sometimes added on top of LBS to achieve higher quality deformations of the mesh. Blendshapes can move one or more vertices according to a control value between 0 (e.g., neutral or resting shape) and 1 (e.g., full blendshape) and have specific blendshape values for specific training poses, but are not directly tied to the rig's skeleton. Using LBS and blendshapes requires many calculations (e.g., LBS calculations, blendshape calculations, for many vertices and bone movements, etc.) which can be computationally challenging for a rigging control system, particularly in real time.

Thus, one goal for the skinning techniques described in detail below is to develop a system that provides high quality, well-generalized skinning and works in a real-time context based upon training data for the poses. In part, to achieve this goal, embodiments of the system are highly user configurable. While many rigging systems are designed to require minimal user input, such systems often suffer from common flaws that make them undesirable for MR or real-time applications. For example, some common disadvantages include one or more of the following.

One example of a disadvantage is a dependence on large numbers of joints. Large numbers of joint transforms may lower the error of the skinning approximation, but do not meet the limits enforced in real-time systems, do not generalize well to novel animations, require more control computation and are generally not easy to understand by humans, limiting their ability to be debugged in context.

A second example of a disadvantage is that overfitting issues can occur, which can require large amounts of input data or difficult to understand control statistics to prevent.

Embodiments of the disclosed systems and methods reduce or avoid the likelihood of some or all of these disadvantages by utilizing human-understandable constraints that describe the characteristics of the resulting system. These constraints allow the system to (optionally) receive human user input so as to achieve a result based upon the human's better understanding of domain specific knowledge.

Examples of Training Data

The parameters that represent transformations of the joints of the skinning system (e.g., a weight map, rotations, and translations) can be extracted from training data that represents a series or sequence of target poses (e.g., facial expressions, body gestures, movements (e.g., sitting, walking, running, etc.)). The skinning parameters can be learned from the training data using various machine learning or artificial intelligence techniques (further described below). The process of learning the skinning parameters from the training data is sometimes referred to as joint decomposition.

Training data comprises meshes that share a topology with a base neutral mesh used for animation of an avatar, but which have been deformed into the target poses used for skinning the avatar. Training data can represent a pose or a blendshape for an avatar. Training data can come from any available source, including one or more of the following.

Scanned Ground truth. The results of the machine learning model can either underfit or overfit the training data depending on the amount, type and format of the training data set. Training data can be generated by scanning a subject (e.g., a model) who performs a series of poses. The scanned data geometrically represents the subject in pose sequences, in three dimensions, for points of articulation as well as deformation ground truth. The imaging scans can, for example, be taken by placing the subject in a photogrammetry capture stage comprising multiple cameras (e.g., two or more) surrounding and pointed at the subject. The cameras can be synchronized to each other to capture images that can be converted into a 3D scan of the subject performing a pose. For static poses, a single scan can be generated. However for an avatar which can move and emote, scans can be taken while the subject performs training poses that include basic expressions units (e.g., smiling, frowning, gesturing, walking, etc.). These scans can be used to create a training data set that is used to construct skinning parameters, which can be used to create a convincing digital avatar of the subject in action.

For example, the scanned imagery can be used to generate a pose correspondence between the avatar's low-order core skeleton (see, e.g., the example of a low order skeleton 1100a in FIG. 11A or the solid-lined portions of the skeleton 1100 in FIG. 11B) and the geometric space of the scan data. The resulting training data can be used to train a joint decomposition system (which determines the skinning parameters from the training data) in a generalized statistical space. For example, improved skinning parameters can be determined from an initial set of skinning parameters. The resulting statistical space can represent any animation or articulation of the avatar, and can be evaluated in real time, for example, with a radial basis function (RBF).

Artist-driven sculpting. This method is often used where real world image capture data is unavailable, impractical, or too expensive to obtain or of poor quality. It is also used in cases where a more art-directed focus is desired such as in 3D animation. This form of data is labor intensive and often human interpreted from insufficient resources, an may be prone to error.

Simulations. Cloth and tissue simulation is often used in visual effects productions to achieve high-fidelity and lifelike deformations. While these practices often produce optimal results, they are computationally heavy and may be unsuitable for real-time applications. In implementations of the joint decomposition system, deformations, such as skin or cloth, can be simulated using real time graphics. By running these simulations through a range of movement (ROM), the system can decompose the deformation space into a statistical model of blendshapes and weights. The statistical model's weights can then be interpolated with an RBF for real-time execution.

Biometrically-derived models. Biomechanical, higher-order skeletons for common types of bone and muscles can be represented in the character's skeletal space via joints and LBS. While muscles exhibit the properties of finite volumes, the stress and strain ratios for muscles can be modeled within the scale matrices of the joint(s) used in their representation. Bones are focused more in the rigid space but require more mechanical properties and structures to achieve desired motion. The mechanics of the bones and muscles can then be captured by the joint decomposition.

Overview of Linear Skinning Systems and Methods

Linear skinning (or linear blend skinning) is a method of transforming the position of a set of points in 3D space based upon the transform of a set of joints. The points can be the vertices of a mesh used to animate an avatar. In the following, the skeleton has J joints indexed by j=1, 2, ..., J, and there are a total of V points of interest indexed by i=1, 2, ..., V. Each joint has a transform associated with it comprising a rotation $R_j$ and a translation $T_j$. A given point $v_i$ can be transformed by a joint j to a new point $v'_i$ using the formula $R_j v_i + T_j$.

For each joint and each point, a weight $w_{ij}$ can represent the influence of the j-th joint on the i-th point. The weight quantifies the amount of influence a particular joint has on a particular point. The collection of all the weights $w_{ij}$ is sometimes referred to as a weight map. The individual weights of the weight map can satisfy a number of constraints. For example, each of the weights is typically non-negative $w_{ij} \geq 0$, and the total influence of all J joints on any point i can be normalized to one: $\Sigma_{j=1}^{J} w_{ij} = 1$.

There can be other constraints on the skinning parameters (e.g., the weight map, the rotations $R_j$, and the translations $T_j$). For example, the number of non-zero weights for any point may be limited to a maximum to reduce the computational burden on the processor animating the mesh and to reduce overfitting. The maximum number M may be, e.g., 4 or 8 or 12, and can be selected based on the memory models of the processors (e.g., commercial graphics processing units (GPUs)) used for the animation. To represent a valid rotation in 3D space, the rotation $R_j$ may be represented in a number of different mathematical ways, e.g., as an orthogonal matrix, which avoids shearing or scaling by the transformation.

The transformed coordinate $v'_i$ for a point $v_i$ is the sum of the weighted transforms for each specific joint:

$$v'_i = \Sigma_{j=1}^{J} w_{ij}(R_j v_i + T_j). \qquad \text{Equation (1)}$$

Example Joint Decomposition

The goal of the joint decomposition process is to calculate the skinning parameters $w_{ij}$, $R_j$ and $T_j$ in a way that reduces or minimizes an error between the transformed positions $v'_i$ (calculated from Eq. (1)) and reference positions $v_i^{TD}$ of these points in target poses in the training data (described above). The decomposition process can be formulated as a constrained optimization problem, and the error can be represented as a Euclidean or L2-norm between the transformed positions and the target pose positions in the training data. Other error functions can be used (e.g., a median or L1-norm). Various constraints on the solution to the constrained optimization problem have been described above and additional constraints are described below.

For example, the constrained optimization can reduce or minimize an error E that can be represented in some embodiments (that use an L2-norm) as:

$$E \Sigma_{i=1}^{V} |v_i^{TD} - \Sigma_{j=1}^{J} w_{ij}(R_j v_i + T_j)|^2. \qquad \text{Equation (2)}$$

Depending on the constraints, optimization methods can include linear or quadratic programming. However, reducing or minimizing the error when there are numerous rotational components subject to complex constraints often requires sophisticated non-linear programming methods. For example, some techniques apply nonlinear solvers that use first and second derivative estimates and work for arbitrary constraints. Other techniques are iterative, where alternately the per-point weights or the joint transforms are locked, and the other components are optimized. In various implementations, optimization techniques include gradient descent, block coordinate descent, downhill simplex, simulated annealing, Levenberg-Marquardt optimization, least squares, nonlinear optimization, heuristic or metaheuristic (e.g., Tabu) searches, a weighted absolute orientation solver, etc.

The constrained optimization algorithm can accept as input an initialization skeleton (e.g., initial positions of the skeletal joints), a mapping of mesh vertices to joints (e.g., skin clusters), and a mesh representing a target pose (or target poses) of an avatar. The constrained optimization algorithm can be iterated until the error E (e.g., calculated from Eq. (2)) between the transformed positions $v'_i$ (e.g., calculated from Eq. (1)) and the reference positions of these points in the target poses in the training data has converged (e.g., the error E is below an error threshold, increments to the transformed positions $v'_i$ are below a threshold, or a maximum number of iterations is reached). The output of the constrained optimization algorithm can be the skinning parameters (e.g., $w_{ij}$, $R_j$ and $T_j$) that provide an improved or optimized fit to the target training poses. In some embodiments, the joint decomposition system can additionally or alternatively output an updated skeleton with joint or vertex positions reflecting the fit to the target training poses. In some embodiments, the joint decomposition system can additionally or alternatively output a radial basis function (RBF) representation of the skinning parameters.

Some embodiments of the joint decomposition system differ from conventional systems based on the inputs used for initialization as well as the constraints under which the system operates.

For example, many decomposition systems take only deformed meshes as input, inferring the number and placement of the joints and their mesh weights from this data. Some systems even attempt to generate a hierarchical skeleton from the input training data. While such systems can work, in practice the unconstrained nature leads to incorrect behavior (e.g., biometrically unreasonable solutions) and a lack of generalizability either through overfitting or finding local minima which are unacceptable in a larger context.

Example Inputs to the Joint Decomposition Process

A skinned mesh requires the mesh and the bone hierarchy, where the bone transforms drive all deformation on the mesh. In practice, working directly with the bone hierarchy that directly deforms the mesh may be disadvantageous. Often, there are many extra bones that are included to obtain better deformation of the avatar. Directly animating these extra bones can significantly slow down the animation task. Additionally, these bones are often dealing with aspects of an avatar such as volume preservation, which is difficult for a human animator to get right, but typically straightforward for a computer to calculate. For automated animation tasks, such as motion capture, it may be impractical to track many of these bones, which may not directly correspond to any real, single, physical element. Further, higher order layers are often used for optional components like hair or clothing which can be altered or replaced on an existing character without changing the base animation.

Instead, in practice a simple lower-order skeleton can be progressively made more complex by the addition of procedurally animated components into a higher order skeleton. FIG. 11A shows an example of a lower order skeleton 1100a, and FIG. 11B shows an example of a higher order skeleton 1100 (dashed lines). These control systems include new bones, creating a higher-order skeleton and a control system which animates these new bones based upon the transforms of the lower-order skeleton used as input. For example, a lower-order skeleton might represent the bones of an avatar's body, corresponding to the avatar's actual skeleton. The higher-order skeleton might include bones that represent muscles of the avatar. These additional bones can be driven by the position of the lower-order skeleton. For example, a bicep "bone" position can be controlled by a corresponding forearm bone in the lower-order skeleton, which represents, among other things, an angle of the elbow at that point in the animation.

These low-to-high order skeletal systems can be quite complex, involving, for example, volume preservation, dynamics (e.g., muscle/fat jiggle), and other systems. In many animation rigs, there can be multiple layers of low-order and high-order skeletons, where the higher-order output of one skeletal system becomes the lower-order input of the next skeletal system. As an example, imagine an avatar where the lowest-order skeleton represents the "real" skeleton of the avatar, a second skeletal system represents the muscles, and a third skeletal system represents the fat that rides on top of the muscles. Additional skeletal systems can be added to represent hair, clothing, or props.

Accordingly, in some implementations, a low order skeleton can comprise a set of bones and joints that represent or resemble anatomical bones and joints (and/or their interconnections) of the avatar that is to be animated. A higher order skeleton (with components added onto a lower order skeleton) can represent muscles, ligaments, fat, hair, clothes, etc. The lower order skeleton can comprise a portion of a set of bones or joints that define the skeleton of a digital character (e.g., similar to the low order skeleton 1100a shown in FIG. 11A, which resembles the bones in a real, human skeleton). The lower order skeleton can represent the base of a hierarchical skeletal structure. A higher order skeleton may be thought of as a difference between a full skeleton (e.g., the skeletal system 1100 shown in FIG. 11B) and the low order skeleton 1100a.

Some joint decomposition systems can begin with no skeleton at all and can infer all bones and bone relationships from the animation. Some such systems can be disadvantageous, because they do not permit specification of the constraints that allow certain advantageous embodiments described herein to generalize well.

When performing joint decomposition, the systems or methods can determine the weights and motions of that final layer of deformation, e.g., the highest-order skeleton. The systems and methods can receive as input at least the hierarchy of the higher-order skeleton so the systems and methods can perform the optimization. However, in some cases, not all the bones in that higher-order skeleton will need to be initialized. For example, the systems and methods can be initialized with the base skeleton pose with the additional higher-order bones set to default values. The systems and methods can determine the best transforms of the additional bones (e.g., starting from the default values).

Accordingly, the systems and methods may receive as input the structure of the higher order skeleton but may not require the pose of the higher order skeleton.

Certain embodiments of the joint decomposition system can be given an initial skeleton together with target poses or skin weights as an option. The skeleton used for initializing the constrained optimization algorithm can be a high-order skeleton, that represents joint and mesh positions that are close to the target pose rather than a base skeleton in a neutral or resting pose (typically unrelated to the target pose). Starting the decomposition in this way, rather than tabula rasa, reduces or prevents the likelihood of mislearning that can come with too much flexibility. It also leads to more efficient optimization as the input skeleton and skinning parameters are already near the desired outcome (namely, to match the target pose(s)). In practice, the initial starting skeleton data can be a very rough match to the desired target. For example, a mesh might be segmented such that each vertex is assigned to a single bone (see, e.g., FIG. 12 for an example of hand segmentation 1200). Such a skinning solution is not acceptable in general, but, used as an initial input, can be sufficient to direct the joint decomposition system in the desired direction.

Example Linear Skinning Constraints

While the base form for linear skinning can be formulated as Equation (1), the optimization equations can be quite complex. This is because of the interdependencies implied by the constraints. The various joint decomposition systems described herein can enforce a variety of constraints, and some of these constraints are user-selectable or can change dynamically during the joint decomposition. Embodiments of the joint decomposition system can accept user-input to better guide the system in finding a biometrically reasonable solution and to better define the problem space in which the optimization technique is to operate.

Constraints that are common to many LBS joint decomposition systems have been described above and include the non-negativity and normalization constraints for the weight map, the requirement that the rotation parameters represent valid rotations (e.g., $R_j$ be an orthogonal matrix), and the maximum number M of non-zero weights per vertex.

Other constraints include parent-child relationships among the joints in the hierarchical skeletal system. For example, a hand joint may be a child of a forearm joint and so forth. Such constraints can enforce rigid bone-like behaviors by restricting a child joint to fixed positions relative to its parent's local space (e.g. positions that are a fixed distance away from the parent joint, to represent the rigid behavior of a bone). This fixed position can be estimated per-pose or using all target poses. Using all target poses can be advantageous for fitting a skeleton to a captured character. In many hierarchical skeletons, a joint's length relative to its parent is fixed during animation and only the orientation is allowed to change. This constraint is analogous to real world bones, which do not change their length readily.

Relationships among the joints can further complicate the optimization equations. For example, a parent-child relationship between two joints $j_1$ and $j_2$ can mean that rotation and translation parameters $R_{j_1}$ and $T_{j_1}$ for joint $j_1$ depend on (e.g., are computed based upon), the rotation and translation parameters $R_{j_2}$ and $T_{j_2}$ for joint $j_2$, which must be accounted for during constrained optimization. Similarly, if the weights of different points are interrelated, the system of optimization equations should include these relationships.

A smoothness constraint can enforce similar weightings to nearby points in the joint or vertex hierarchy. For example, the system can restrict vertices to use similar weights to vertices that are topologically close on the mesh. The smoothness constraint can advantageously create smoother skin deformations. A vertex may be topologically close to another vertex if they are neighbors or nearby neighbors (e.g., within a threshold number of edges away on the mesh, such as less than 3, 5, 7, 10, 12, etc.). Smoothness may be constrained by not permitting weights of vertices that are topologically close to each other to not differ from each other by more than a smoothing factor.

In some implementations, joints can be constrained by geometric models that represent the underlying anatomical structures the joint represents (e.g., length, lateral size, limits on range of motion (ROM) relative to nearby joints, etc.). For example, a joint that represents a finger bone can be given a radius and length and a range of motion so that it does not bend backward onto the upper surface of the hand. Applying joint constraints during the decomposition process can be advantageous and lead to more biometrically reasonable joint decompositions.

One or more other novel constraints can additionally or alternatively be incorporated into embodiments of the disclosed systems. The following provides a non-limiting list of various constraints that can be used during the decomposition process.

Joint position can be estimated during the constrained optimization process or locked to prevent change. For example, a joint (or group of joints, or vertices associated with these joints) can be locked when the decomposition process is optimizing other subsets of the skeleton or the mesh (and then unlocked when the process optimizes that joint or group of joints). For example, while solving for skinning parameters for the hand joints, the leg joints can be locked.

Extending the joint parent-child relationships described above, joint position can be constrained to translate only along a specific axis or axes of the parent joint to produce more robust rigs. For example, joint position may be locked or unlocked along specific axes as above for determining bone lengths.

Similar to locking or unlocking joint position, joint orientation, radius, length, etc. may be locked or unlocked in a similar fashion.

Joints or vertices can be restricted to only weight to joints which are geometrically close. For example, a vertex on the arm may have a zero weight with respect to joints in the leg, to reflect the anatomical constraint that leg movement and arm movement are independent. Joints or vertices can be considered to be geometrically close when a particular joint tends to move when another joint moves (e.g., a hand tends to move when the arm it is attached to moves, but the hand does not move when the other arm moves).

Joint distance constraints can be applied. Utilizing joint geometric models, the system can calculate a distance of a vertex from a joint and use this distance in the optimization procedure. For example, a vertex can be excluded from using a joint (e.g., the weight set to 0) if the distance is too large, e.g., above a threshold distance. As another example, weights can be non-zero only for vertices within a threshold distance of a joint. Distance between joints (or vertices) can be calculated as a distance traversed along the skeleton of the mesh (see, e.g., the skeleton 1100 shown in FIG. 11B), e.g., because the joints/vertices can represent a hierarchical ordering of interconnections.

Vertex and joint selection constraints can be applied. The system can specify multiple named selections of vertices and joints, which can be combined in various ways. For example, a vertex selection can be locked to a specific weighting or weighted to a specific selection of joints or left out of the optimization process altogether.

Weights can be optimized or locked on a per joint, per vertex, or per joint-vertex pair through the use of segmentation sets, which relate a specific set of a vertex or vertices to a specific set of joint(s).

The foregoing list of constraints is not intended to be exhaustive. The system can receive user input to select the constraints that are to be applied or the parameters used for the constraints (e.g., distance thresholds, segmentation sets, etc.). The constraints (or the constraint parameters) can change dynamically during joint decomposition. For example, distance thresholds may start relatively small (e.g., neighboring joints) and then increase as the joint decomposition proceeds. Thus, the system can be highly configurable to better define the problem space in which the joint decomposition is to operate.

Example Applications to Real-Time Rigging Systems

The statistical pose space used for joint decomposition is well thought out and planned from end to end. The results of the joint decomposition are deterministic upon what information the decomposition is seeded with. If joint decomposition is allowed to generate the skinning transforms without constraint, then the results may not be usable or human interpretable. Embodiments of the joint decomposition technique improve or optimize the behavior of higher order skeletons to match the training data (e.g., the ground truth scan data). By seeding the joint decomposition system with valid information, the system tends to avoid outliers and produce results that are qualitative and practical in application in the domain of real time rigging systems for mixed reality or gaming.

Segmentation refers to making a mapping between a specific set of vertices and a set of joints. This mapping can isolate and localize the results of the joint decomposition. Segmentation can also increase the performance of the system, because of the reduced number of calculations needed to achieve a converged result. For example, as described above, the joint decomposition can lock the weights for all joints except those found in the segmentation set and can analyze only the associated vertices to optimize the LBS skinning parameters.

As an example, if an animator desires to only decompose the hand, segmentation sets can be generated for each individual finger. This prevents, for example, the joint of the middle finger affecting the ring or index fingers, and localizes the results of the decomposition in the skeletal hierarchy so that joints that biomechanically control vertices are optimized while joints that do not (e.g., outside the segmentation set) are locked.

Joint decomposition can (optionally) be integrated with a falloff radius, which blends the results for a particular region with an existing skin cluster or LBS. For example, falloff can feather the skinning parameters found for one set of joints to another set of joints. As one example, falloff may utilize three regions: a first region where the skinning transformation is calculated, a second, more distant region that is unmodified (e.g., locked) by the decomposition, and an intermediate region between the first and second regions where a falloff parameter smoothly transitions the skinning parameters from the first region (e.g., within a segmentation set) to the second region (e.g., outside the segmentation set). The falloff may implement weighted averaging in the intermediate region.

Figure 12:
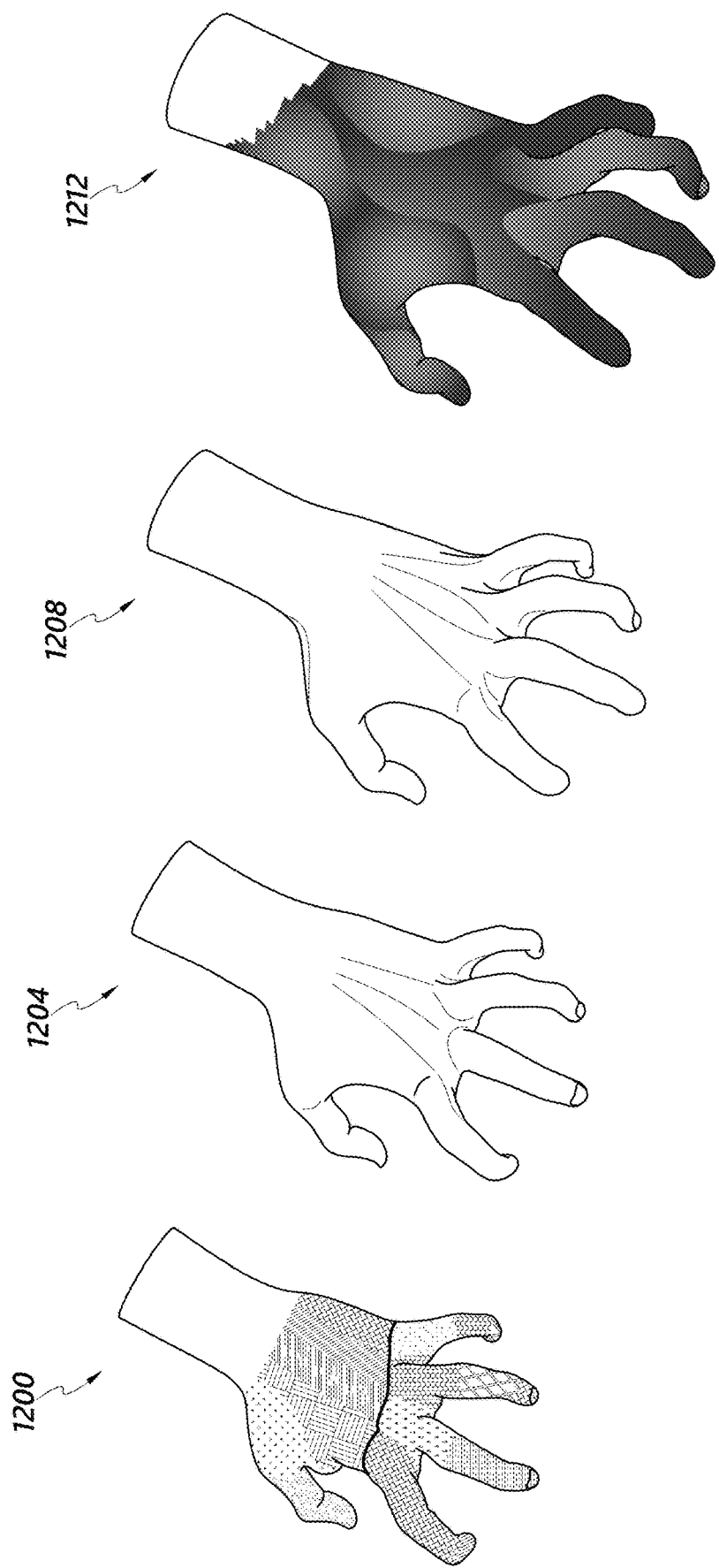
FIG. 12 illustrates examples of joint decomposition for hand deformations.

FIG. 12 illustrates examples of joint decomposition for hand deformations. In this example, the joint decomposition used falloff and segmentation sets for each finger. In hand 1200, the different cross-hatchings represent the segmentation or binding of vertices to a particular set of finger joints. The hand 1200 can be used as an input to initialize the joint decomposition process, with hand 1208 representing a target hand pose (in this case, a blendshape for a desired hand deformation). Hand 1204 shows an example of results from the joint decomposition of the hand. Hand 1212 is overlaid with a heatmap that shows (in differing shades of gray) regions in which the error between the target hand 1208 and the LBS decomposition hand 1204 are greater (dark gray) or lesser (lighter gray). The LBS joint decomposition provides a good match to the target hand 1208, with some errors in the pad behind the thumb and between the index and middle fingers.

Another aspect to the user-directability of the joint decomposition is the ability to set transformational limits on one or more of the joints. For example, during the decomposition process the rotation and translation parameters of a joint (e.g., $R_j$ and $T_j$) can be allowed to be updated in up to six DOF and in conjunction with the constrained optimization of the mesh weights to match the conformal properties of the target. If no constraints are imposed on the optimization, then the joints may overfit the target training data. Overfitting has poor predictive and computational performance, and may become sensitive to minor fluctuations in the input training data. The undesirable variance of the output from overfitting may manifest as high frequency artifacts commonly referred to as jumping or popping.

This overfitting is undesired and may be deemed unusable within the statistical space and application of pose space deformations. By applying constraints, the optimization results in a practical threshold and reduces or avoids the popping resulting from overfitting. Various such constraints have been described above (e.g., locking joint position or orientation, joint distance constraints, segmentation sets, etc.). For example, a constraint limiting the joints of a segmentation to move in a subset of 3D space (e.g., a range of x, y, or z values, or a range of yaw, pitch, or roll angles) can be applied to conform the behavior of the joints to how actual joints move biometrically.

For a system of joints, e.g., a biomechanical rigging comprising a skeleton 1100, improved or optimal positional or rotational information for that joint and its related skin cluster weight can be determined and applied in the joint decomposition. In the event that no joints are provided or targeted, the system (or via user-input) can generate joints that can be added to a skin cluster.

Figure 13:
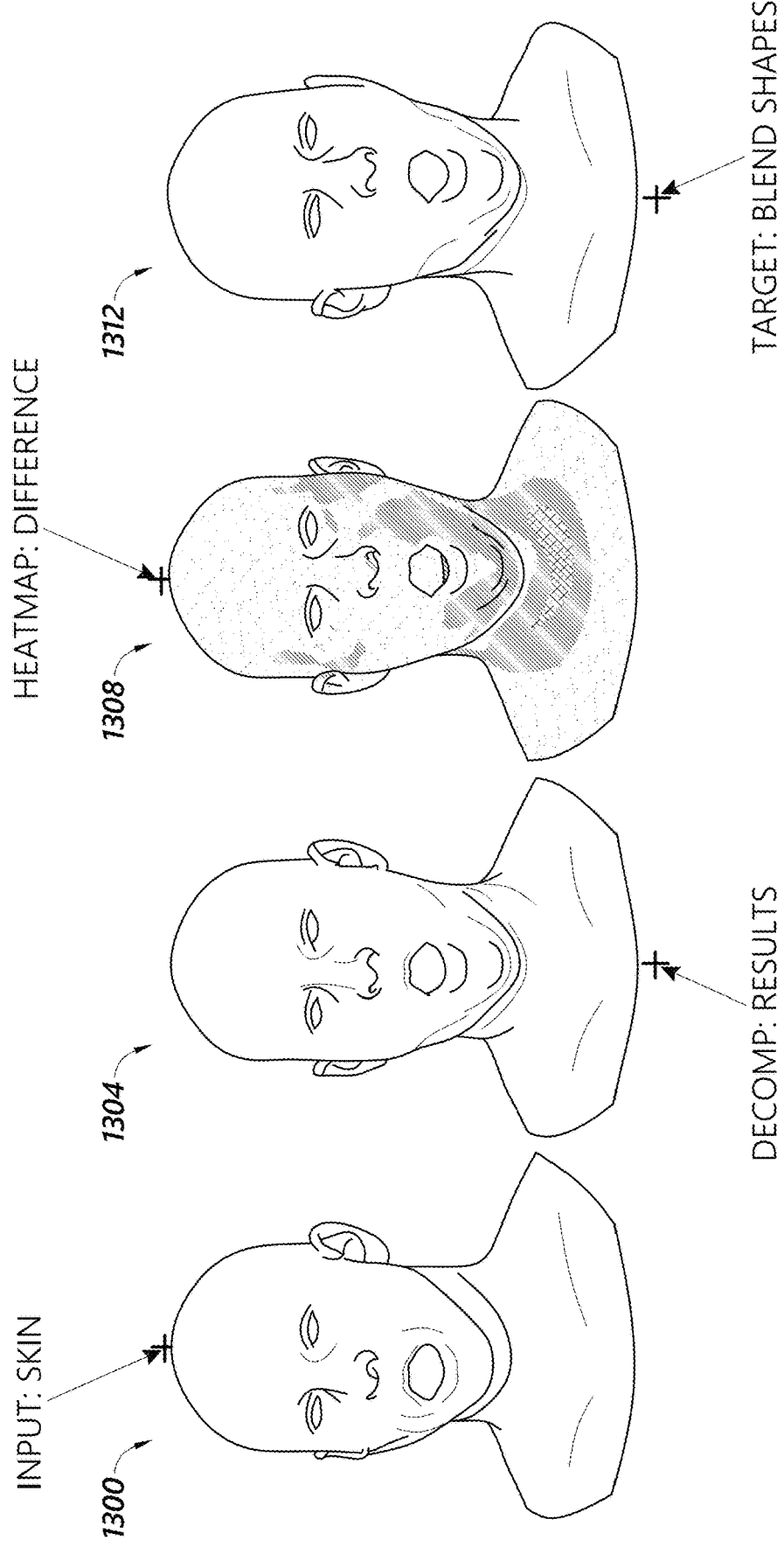
FIG. 13 illustrates examples of joint decomposition for jaw deformations.

FIG. 13 illustrates examples of joint decomposition for jaw deformations. In this example, three extra joints were added to the jaw line, as opposed to a single joint for the entire jaw, and constraints were imposed to the degrees of freedom in which the extra jaw line joints can move. Head 1300 shows the input skin (mesh) used to initialize the joint decomposition, head 1312 shows the target pose (e.g., a blendshape in this example), and head 1304 shows the results of the joint decomposition. Head 1308 is overlaid with a heatmap that shows an example of errors between the decomposition results 1304 and the target 1312. The match is quite good throughout most of the face, with a region of larger error in the lower neck.

Additional Aspects and Advantages of Joint Decomposition Systems and Methods

The challenge of high-quality, well-generalized, real-time mesh deformation of a digital character can be solved by deriving mesh (e.g., skin) weights and joint positions from training data. The mesh weights and joint positions can be determined by seeding a constrained optimization engine (e.g., utilizing error minimization) with an initial target shape, a high-order skeleton, and skin clusters, and using human-understandable constraints.

Embodiments of joint decomposition systems and methods for improved or high-quality linear blend skinning (LBS) are provided. These systems and methods may algorithmically "paint" weights for linear blend skinning and shift high-order skeleton joint or bone locations if needed, so that the resulting LBS provides high quality animation, thereby reducing or eliminating the need for blendshapes.

The output of a joint decomposition system can include an update to a high-order skeleton (that may have been used to initialize the system), that encompasses new linear blend skinning weights or joint or bone positions (one or both of which can be optimized).

For example, standard LBS is typically unable to capture fine details like crow's feet (e.g., clusters of tiny wrinkles and fine lines that form around the outer corners of the eyes), whereas embodiments of the present systems and methods are able to do so. In standard animation techniques to obtain crow's feet, a human animator moves joints to where he or she subjectively feels is the best location and then manually paints vertex assignments for those high-order skeletal joints to match the specific shape of the crow's feet, resulting in an iterative process that takes significant time to perform and is unsuitable for real-time applications such as AR or gaming.

Embodiments of the joint decomposition system can convert a target blendshape to LBS vertex mappings to permit a rigging system to simulate the blendshape quickly and efficiently (see, e.g., the examples in FIGS. 12 and 13).

Methods for algorithmically deriving efficient mesh weights and joint positions for use with a linear blend skinning interpolation engine are provided. Embodiments of the present techniques differ from standard techniques in which LBS parameters and blendshapes are input into a radial basis function (RBF) interpolation engine to determine which blendshapes should be applied to deform the mesh for new avatar poses. Standard techniques can be hard on the interpolation engine because there are many calculations involved when using blendshapes. In contrast to standard techniques, certain embodiments herein input LBS parameters (e.g., a weight map, rotations, translations) into an RBF interpolation engine to determine how to deform the avatar's mesh, without using blendshapes. Possible advantages of certain such embodiments include that fewer calculations need to be performed by the interpolation engine; therefore, certain such techniques are not only faster, but are also easier to implement computationally, which enables real time performance.

Embodiments of the joint decomposition system can take as inputs skin clusters (e.g., mappings of mesh vertices to joints), a high-order skeleton to initialize the constrained optimization algorithm, and a target shape that is to be matched (e.g., by reducing or minimizing error) during the optimization.

Benefits of the joint decomposition process can include high quality LBS skinning parameters as an output that are well-generalized and suitable for real-time animation applications such as AR or gaming. The LBS output can be considered well generalized because the output can be reused within the RBF interpolation engine as well as being reused for different avatars or characters. This is possible because RBFs typically utilize a known or fixed set of inputs, outputs, and training poses. The algorithmic weight painting described herein can use the same high-order skeleton as an input to initialize the optimization to match a target pose, so that all LBS values are calculated based on the same overall structure and format of the joints and vertices, thereby enabling use of the LBS output in an RBF interpolation engine.

As described above, the joint decomposition systems and methods can utilize human understandable constraints that are placed on the optimization algorithm. For example, an upper arm can move roughly 180 degrees straight up or down about the shoulder joint, when raising or lowering the arm. This range of motion can be added as a constraint to the constrained optimization algorithm, so the joint decomposition converges to a biometrically correct solution instead of converging in an anatomically impossible way.

Some traditional systems create a high-order skeleton either from scratch or from a low-order skeleton, which can be computationally challenging. Accordingly, embodiments of the joint decomposition system use a high-order skeleton as an input and permit the constrained optimization algorithm to move or adjust or optimize the high-order skeleton instead of starting with a blank slate. Use of a high-order skeleton as an input enables generalization, because the high-order skeleton can be used across different avatars, so there are the same number of joints for each of the different avatars, etc. Since all humans have the same underlying high-order skeleton, this is an acceptable standardization to make.

Example Processes for Joint Decomposition

Figure 14:
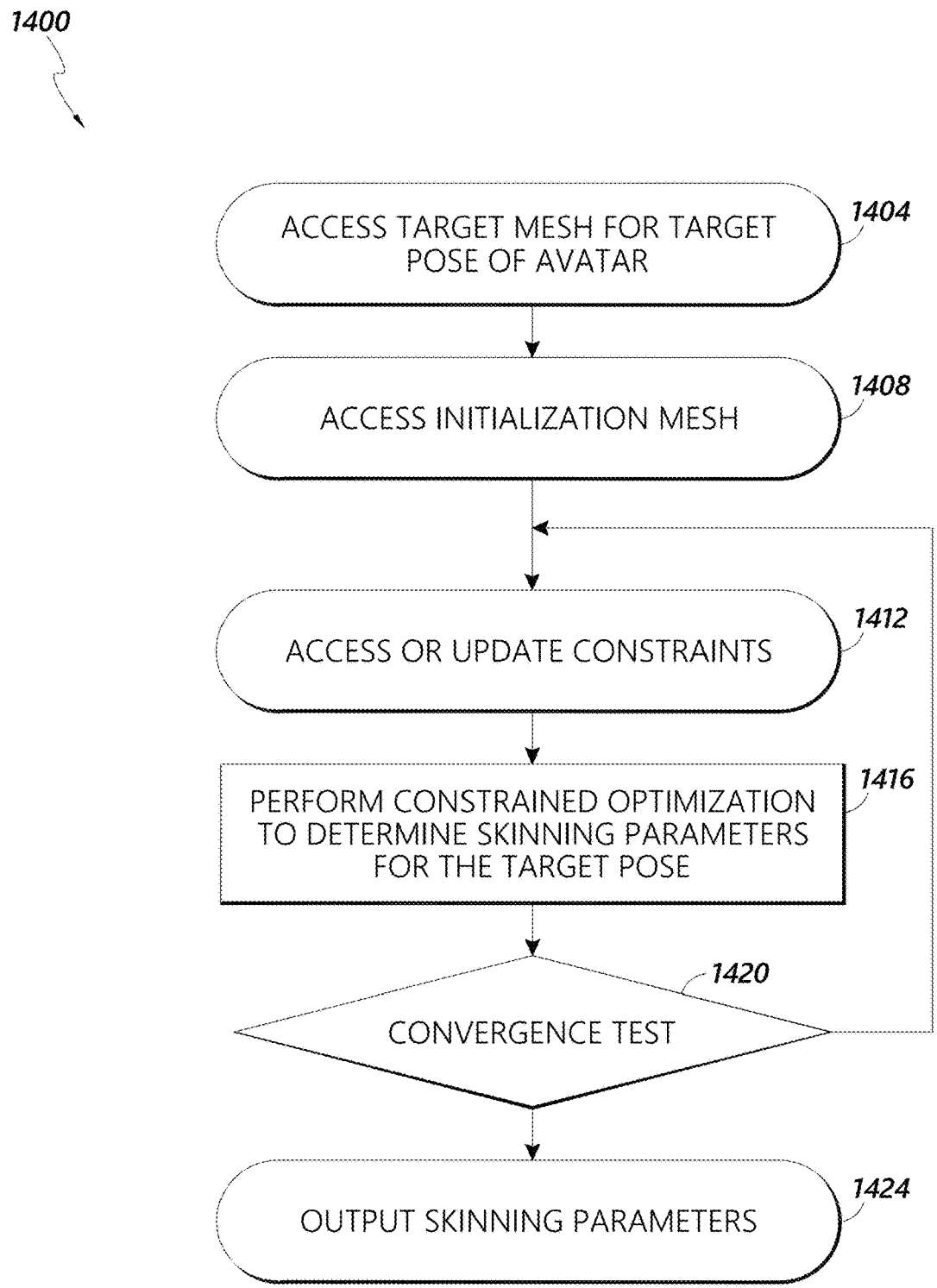
FIG. 14 is a flowchart for an example method for joint decomposition.

FIG. 14 illustrates an example process 1400 for joint decomposition. The example process 1400 may be performed by one or more computing systems including the remote processing module 270, the local processing and data module 260, the avatar processing and rendering system 690 of FIG. 6B, the remote computing system 920 of FIG. 9A, other suitable computing device(s), and combinations of these and other computing devices.

At block 1404, the process 1400 accesses a target mesh for a target pose of an avatar. The target mesh can comprise any of the training data sets described herein (e.g., scanned ground truth, artist-driven sculpting, simulations, or biometrically-derived models). The target mesh can comprise one or more of a sequence of poses for the avatar. The target mesh can share a topology with a base neutral mesh used for animation of an avatar, but which has been deformed into the target pose(s) used for skinning the avatar.

At block 1408, the process 1400 accesses an initialization mesh that can be used to seed a constrained optimization process. The initialization mesh can comprise a base skeleton (e.g., in a neutral or resting pose) or a higher-order skeleton (e.g., in a pose that roughly approximates the target pose). The initialization mesh can comprise skin clusters, which assign mesh vertices to joints (or bones) of the skeleton. As described herein, it may be advantageous to initialize the constrained optimization process with a higher-order skeleton, which can lead to more rapid and efficient convergence of the optimization. The initialization mesh can optionally include an initial weight map, rotation, or translation parameters that are close to the target pose, which also may improve convergence of the process 1400. The initial weight map may be created using any suitable method, including LBS as described above, or a user defined method.

At block 1412, the process accesses or updates constraints to be applied to the constrained optimization process. A variety of constraints have been described in detail above (e.g., locking joint position or orientation, joint distance or range of motion constraints, segmentation sets, etc.). By applying suitable constraints, the optimization results in a practical threshold and reduces or avoids popping from overfitting. Also as described above, the constraints can comprise human understandable constraints which are anatomically or biometrically motivated (e.g., a constraint on the range of motion of a shoulder or a knee). Human-understandable constraints may advantageously permit the constrained optimization process to converge to a biometrically correct solution instead of converging in an anatomically impossible way.

At block 1416, the process 1400 performs constrained optimization subject to the constraints accessed at block 1412 to determine skinning parameters for the target pose of the avatar. The constrained optimization can be initialized with the initialization mesh accessed at block 1408. As described herein with reference to Equations (1) and (2), the output of the constrained optimization can be an improved or optimized set of skinning parameters such as, e.g., a weight map $w_{ij}$, rotations $R_j$, and translations $T_j$ for all the joints of the skeleton. Depending on the constraints accessed or updated at block 1412, constrained optimization methods can include linear or quadratic programming, nonlinear solvers that use first and second derivative estimates. Other constrained optimization techniques are iterative, where alternately the per-point weights or the joint transforms are locked, and the other components are optimized. In various implementations, optimization techniques include gradient descent, block coordinate descent, downhill simplex, simulated annealing, Levenberg-Marquardt optimization, least squares, nonlinear optimization, heuristic or metaheuristic (e.g., Tabu) searches, a weighted absolute orientation solver, etc.

At block 1420, a convergence test is applied to the constrained optimization process. For example, convergence may be found if the error E is below an error threshold, or if increments to the transformed positions $v'_i$ are below a threshold (e.g., the mesh positions are barely changing during the iterations), or a maximum number of iterations is reached. If convergence has not occurred, the process 1400 can return to block 1412, where the constraints can be updated. For example, distance thresholds or segmentation sets may change as the joint decomposition proceeds. In some embodiments, user input can be received at block 1412 to assist improving the convergence and the use of human-understandable constraints can be advantageous, since a human animator can determine the progress of the convergence and apply, e.g., a biometrically suitable constraint at an appropriate stage of the optimization process. Thus, the system can be highly configurable to better define the problem space in which the joint decomposition is to operate.

If the constrained optimization has converged, the process 1400 moves to block 1424 where the results of the optimization are output. For example, the output can be stored in non-transitory computer storage, communicated to an augmented reality display device 930b, 930c (e.g., via the network 990 described with reference to FIG. 9A) for animation of virtual avatars, etc. For linear blend skinning, the output can include a weight map $w_{ij}$, rotations $R_j$, and translations $T_j$ for all the joints of the skeleton. In some embodiments, a radial basis function (RBF) representation of the skinning parameters can be calculated at block 1424 and output.

Additional Aspects

1. A system comprising: non-transitory computer storage configured to store: a target mesh representing a pose of a virtual avatar, the target mesh comprising a plurality of target mesh vertices; an initialization skeleton comprising a plurality of joints; skinning parameters representing deformation of a skeleton into the pose of the virtual avatar; and a set of constraints associated with the skinning parameters or the joints; and a hardware processor in communication with the non-transitory computer storage, the hardware processor programmed to: access the target mesh, the initialization skeleton, and the set of constraints; perform a constrained optimization process to determine the skinning parameters that provide a match to the target mesh, the constrained optimization process subject to the set of constraints; and output the skinning parameters.

2. The system of aspect 1, wherein the target mesh is determined from photographic scans of a human or animal subject performing a pose.

3. The system of any of the preceding aspects, wherein the target mesh is determined from artist-driven sculpting, a computational simulation of the pose, or a biometrically-derived model.

4. The system of any of the preceding aspects, wherein the initialization skeleton comprises a high-order skeleton.

5. The system of any of the preceding aspects, wherein the initialization skeleton comprises a low-order skeleton in a base or neutral pose.

6. The system of any of the preceding aspects, wherein the initialization skeleton further comprises a skin cluster mapping of vertices to joints of a skeleton.

7. The system of any of the preceding aspects, wherein the skinning parameters comprise a weight map that measures amount of influence of a joint on a vertex.

8. The system of any of the preceding aspects, wherein the skinning parameters comprise six degree of freedom parameters associated with movement of each joint.

9. The system of aspect 8, wherein the six degree of freedom parameters comprise a rotation and a translation.

10. The system of any of the preceding aspects, wherein the hardware processor is further programmed to calculate a radial basis function (RBF) representation associated with the skinning parameters.

11. The system of any of the preceding aspects, wherein the constrained optimization process is programmed to implement a falloff configured to blend a result from a first region into a second region.

12. The system of any of the preceding aspects, wherein the constrained optimization process comprises linear or quadratic programming.

13. The system of any of the preceding aspects, wherein the constrained optimization process comprises a nonlinear solver utilizing first derivative or second derivative estimates.

14. The system of any of the preceding aspects, wherein the set of constraints comprises one or more of: a non-negativity constraint for weights of a weight map; a normalization constraint for the total influence of all joints on a vertex; a maximum number of non-zero weights for any vertex; a constraint that a rotation parameter associated with joint movement represents a three-dimensional rotation; or a constraint that a rotation parameter associated with joint movement comprises an orthogonal matrix.

15. The system of any of the preceding aspects, wherein the set of constraints comprises one or more of: a constraint that restricts a child joint to being a fixed distance from a parent joint; a smoothness constraint that restricts neighboring vertices of a mesh to have similar weights in a weigh map; a geometric constraint representing an anatomical characteristic of a joint; a geometric constraint representing a length, a lateral size, or a range of movement (ROM) of a joint; a constraint that locks a subset of joints from being updated during the constrained optimization process; a constraint that a joint position can translate only along a specific axis; a constraint that locks a joint characteristic during the constrained optimization process; a constraint that sets a weight for a vertex to zero if a joint is located beyond a threshold distance from the vertex; or a constraint incorporating a segmentation set that relates a set of one or more vertices to a set of one or more joints.

16. The system of any of the preceding aspects, wherein the set of constraints comprises a constraint incorporating a segmentation set that relates a set of one or more vertices to a set of one or more joints, and wherein the constrained optimization process is programmed to act only on joints or vertices in the segmentation set.

17. The system of any of the preceding aspects, wherein the hardware processor is programmed to dynamically update the set of constraints during the constrained optimization process.

18. A method comprising: under control of a hardware processor in communication with non-transitory storage: accessing a target mesh representing a target pose for a virtual avatar; accessing an initialization mesh for use in matching the target mesh; accessing a set of constraints; performing constrained optimization to determine skinning parameters that represent the target pose, the constrained optimization performed subject to the set of constraints, the constrained optimization initialized with the initialization mesh; and outputting the skinning parameters.

19. The method of aspect 18, wherein the target mesh is determined from photographic scans of a human or animal subject performing the target pose, artist-driven sculpting, a computational simulation of the target pose, or a biometrically-derived model of the target pose.

20. The method of aspect 18 or aspect 19, wherein the initialization mesh comprises a high-order skeleton.

21. The method of any one of aspects 18-20, wherein the initialization mesh comprises a skin cluster mapping of vertices of a mesh to joints of a skeleton.

22. The method of any one of aspects 18-21, wherein the skinning parameters comprise a weight map that measures amount of influence of a joint on a vertex.

23. The method of any one of aspects 18-22, wherein the skinning parameters comprise six degree of freedom parameters associated with movement of each joint of a skeleton.

24. The method of aspect 23, wherein the six degree of freedom parameters comprise a rotation and a translation.

25. The method of any one of aspects 18-24, further comprising calculating a radial basis function (RBF) representation associated with the skinning parameters.

26. The method of any one of aspects 18-25, wherein performing constrained optimization comprises iterating an error term between a transformed mesh and the target mesh until convergence.

27. The method of any one of aspects 18-26, further comprising dynamically updating the set of constraints while performing the constrained optimization.

28. The method of aspect 27, wherein dynamically updating the set of constraints comprises receiving user input regarding the set of constraints.

29. The method of any one of aspects 18-28, wherein the set of constraints comprises one or more of: a non-negativity constraint for weights of a weight map; a normalization constraint for the total influence of all joints on a vertex; a maximum number of non-zero weights for any vertex; a constraint that a rotation parameter associated with joint movement represents a three-dimensional rotation; or a constraint that a rotation parameter associated with joint movement comprises an orthogonal matrix.

30. The method of any one of aspects 18-29, wherein the set of constraints comprises one or more of: a constraint that restricts a child joint to being a fixed distance from a parent joint; a smoothness constraint that restricts neighboring vertices of a mesh to have similar weights in a weigh map; a geometric constraint representing an anatomical characteristic of a joint; a geometric constraint representing a length, a lateral size, or a range of movement (ROM) of a joint; a constraint that locks a subset of joints from being updated during performing the constrained optimization; a constraint that a joint position can translate only along a specific axis; a constraint that locks a joint characteristic during performing the constrained optimization; a constraint that sets a weight for a vertex to zero if a joint is located beyond a threshold distance from the vertex; or a constraint incorporating a segmentation set that relates a set of one or more vertices to a set of one or more joints.

31. The method of any one of aspects 18-30, wherein the set of constraints comprises a constraint incorporating a segmentation set that relates a set of one or more vertices to a set of one or more joints, and wherein performing the constrained optimization comprises acting only on joints or vertices in the segmentation set.

32. A method for automatically painting weights for linear blend skinning and determining bone locations comprising: under control of a hardware processor in communication with non-transitory storage: solving an error minimization equation based on an initial linear blend skinning weight set, a high order skeleton, and a target pose, wherein the equation is subject to human-understandable constraints.

33. The method of aspect 32, wherein a first human-understandable constraint comprises a restricted pose space for a limb rotation based on an anatomical constraint.

34. The method of aspect 33, wherein the limb rotation comprises an arm that is restricted to not move through the digital character's torso.

35. The method of any one of aspects 32-34, wherein a second human-understandable constraint comprises preventing a portion of a mesh from changing.

36. A method comprising: under control of a hardware processor in communication with non-transitory storage: algorithmically deriving skin weights and joint positions using an algorithm, wherein inputs to the algorithm are an initial linear blend skinning weight set, a high order skeleton, and a target pose, wherein the algorithm is subject to a set of constraints based on one or more human-understandable constraints.

37. The method of aspect 36, wherein a first human-understandable constraint comprises a restricted pose space for a limb rotation based on an anatomical constraint.

38. The method of aspect 37, wherein the limb rotation comprises an arm that is restricted to not move through the digital character's torso.

39. The method of any one of aspects 36-38, wherein a second human-understandable constraint comprises preventing a portion of a mesh from changing.

40. A system comprising non-transitory storage and a hardware processor programmed to perform the method of any one of aspects 18-39.

OTHER CONSIDERATIONS

Each of the processes, methods, and algorithms described herein and/or depicted in the attached figures may be embodied in, and fully or partially automated by, code modules executed by one or more physical computing systems, hardware computer processors, application-specific circuitry, and/or electronic hardware configured to execute specific and particular computer instructions. For example, computing systems can include general purpose computers (e.g., servers) programmed with specific computer instructions or special purpose computers, special purpose circuitry, and so forth. A code module may be compiled and linked into an executable program, installed in a dynamic link library, or may be written in an interpreted programming language. In some implementations, particular operations and methods may be performed by circuitry that is specific to a given function.

Further, certain implementations of the functionality of the present disclosure are sufficiently mathematically, computationally, or technically complex that application-specific hardware or one or more physical computing devices (utilizing appropriate specialized executable instructions) may be necessary to perform the functionality, for example, due to the volume or complexity of the calculations involved or to provide results substantially in real-time. For example, animations or video may include many frames, with each frame having millions of pixels, and specifically programmed computer hardware is necessary to process the video data to provide a desired image processing task or application in a commercially reasonable amount of time. As another example, calculating the weight map, rotation, and translation parameters for a skinning system by solving a constrained optimization problem for these parameters is highly computationally intensive (see, e.g., the example processes 1400 described with reference to FIG. 14).

Code modules or any type of data may be stored on any type of non-transitory computer-readable medium, such as physical computer storage including hard drives, solid state memory, random access memory (RAM), read only memory (ROM), optical disc, volatile or non-volatile storage, combinations of the same and/or the like. The methods and modules (or data) may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). The results of the disclosed processes or process steps may be stored, persistently or otherwise, in any type of non-transitory, tangible computer storage or may be communicated via a computer-readable transmission medium.

Any processes, blocks, states, steps, or functionalities in flow diagrams described herein and/or depicted in the attached figures should be understood as potentially representing code modules, segments, or portions of code which include one or more executable instructions for implementing specific functions (e.g., logical or arithmetical) or steps in the process. The various processes, blocks, states, steps, or functionalities can be combined, rearranged, added to, deleted from, modified, or otherwise changed from the illustrative examples provided herein. In some embodiments, additional or different computing systems or code modules may perform some or all of the functionalities described herein. The methods and processes described herein are also not limited to any particular sequence, and the blocks, steps, or states relating thereto can be performed in other sequences that are appropriate, for example, in serial, in parallel, or in some other manner Tasks or events may be added to or removed from the disclosed example embodiments. Moreover, the separation of various system components in the implementations described herein is for illustrative purposes and should not be understood as requiring such separation in all implementations. It should be understood that the described program components, methods, and systems can generally be integrated together in a single computer product or packaged into multiple computer products. Many implementation variations are possible.

The processes, methods, and systems may be implemented in a network (or distributed) computing environment. Network environments include enterprise-wide computer networks, intranets, local area networks (LAN), wide area networks (WAN), personal area networks (PAN), cloud computing networks, crowd-sourced computing networks, the Internet, and the World Wide Web. The network may be a wired or a wireless network or any other type of communication network.

The systems and methods of the disclosure each have several innovative aspects, no single one of which is solely responsible or required for the desirable attributes disclosed herein. The various features and processes described above may be used independently of one another, or may be combined in various ways. All possible combinations and subcombinations are intended to fall within the scope of this disclosure. Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. No single feature or group of features is necessary or indispensable to each and every embodiment.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended claims are to be construed to mean "one or more" or "at least one" unless specified otherwise.

As used herein, a phrase referring to "at least one of" a list of items refers to any combination of those items, including single members. As an example, "at least one of: A, B, or C" is intended to cover: A, B, C, A and B, A and C, B and C, and A, B, and C. Conjunctive language such as the phrase "at least one of X, Y and Z," unless specifically stated otherwise, is otherwise understood with the context as used in general to convey that an item, term, etc. may be at least one of X, Y or Z. Thus, such conjunctive language is not generally intended to imply that certain embodiments require at least one of X, at least one of Y and at least one of Z to each be present.

Similarly, while operations may be depicted in the drawings in a particular order, it is to be recognized that such operations need not be performed in the particular order shown or in sequential order, or that all illustrated operations be performed, to achieve desirable results. Further, the drawings may schematically depict one more example processes in the form of a flowchart. However, other operations that are not depicted can be incorporated in the example methods and processes that are schematically illustrated. For example, one or more additional operations can be performed before, after, simultaneously, or between any of the illustrated operations. Additionally, the operations may be rearranged or reordered in other implementations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A system for automatically painting weights for linear blend skinning and determining bone locations, the system comprising:
a hardware processor in communication with a non-transitory storage, the hardware processor programmed to:
solve an error minimization equation based on an initialization skeleton in an initial pose and a target pose to derive skinning parameters that provide a match between initialization mesh vertices of an initialization mesh that corresponds to the initial pose and target mesh vertices of a target mesh that corresponds to the target pose, wherein the error minimization equation is subject to a set of constraints, and wherein derivation of the skinning parameters comprises determining using the error minimization equation that a difference between 1) positions of the initialization mesh vertices adjusted as a result of a transformation of the initialization skeleton into the target pose and 2) positions of a corresponding set of one or more target mesh vertices satisfies an error threshold; and
output the skinning parameters.

2. The system of claim 1, wherein the skinning parameters comprise one or more weights, one or more rotations, and one or more translations associated with transformation of one or more joints of the initialization skeleton to a different pose.

3. The system of claim 1, wherein one or more joints of the initialization skeleton are initially transformed using an initial linear blend skinning weight set and subsequently transformed by a refined linear blend skinning weight set determined by solving the error minimization equation.

4. The system of claim 3, wherein the hardware processor is programmed to iteratively solve the error minimization equation.

5. The system of claim 1, wherein the initialization skeleton comprises a high-order skeleton.

6. The system of claim 1, wherein the set of constraints comprises a first constraint that restricts a child joint to being a fixed distance from a parent joint, a second constraint that a joint can translate only along a specific axis, and a third constraint that sets a weight for a vertex of the initialization skeleton to zero if a joint is located beyond a threshold distance from the vertex.

7. The system of claim 6, wherein the set of constraints comprises a constraint that a restricted pose space for a limb rotation is based on an anatomical constraint.

8. The system of claim 7, wherein the limb rotation comprises an arm that is restricted to not move through a digital character's torso.

9. The system of claim 6, wherein:
the set of constraints further comprises a constraint incorporating a segmentation set that relates a set of one or more initialization mesh vertices to a set of one or more joints of the initialization skeleton.

10. The system of claim 6, wherein the set of constraints further comprises a constraint that locks a subset of joints from being updated when solving the error minimization equation.

11. The system of claim 1, wherein the set of constraints comprises a non-rigid constraint.

12. A method for automatically painting weights for linear blend skinning and determining bone locations comprising:
under control of a hardware processor in communication with a non-transitory storage:
solving an error minimization equation based on an initialization skeleton in an initial pose and a target pose to derive skinning parameters that provide a match between initialization mesh vertices of an initialization mesh that corresponds to the initial pose and target mesh vertices of a target mesh that corresponds to the target pose, wherein the error minimization equation is subject to a set of constraints, and wherein derivation of the skinning parameters comprises determining using the error minimization equation that a difference between 1) positions of the initialization mesh vertices adjusted as a result of a transformation of the initialization skeleton into the target pose and 2) positions of a corresponding set of one or more target mesh vertices satisfies an error threshold; and
outputting the skinning parameters.

13. The method of claim 12, wherein the skinning parameters comprise one or more weights, one or more rotations, and one or more translations associated with transformation of one or more joints of the initialization skeleton to a different pose.

14. The method of claim 12, wherein one or more joints of the initialization skeleton are initially transformed using an initial linear blend skinning weight set and subsequently transformed by a refined linear blend skinning weight set determined by solving the error minimization equation.

15. The method of claim 14, wherein the method comprises iteratively solving the error minimization equation.

16. The method of claim 12, wherein the initialization skeleton comprises a high-order skeleton.

17. The method of claim 12, wherein the set of constraints comprises a first constraint that restricts a child joint to being a fixed distance from a parent joint, a second constraint that a joint can translate only along a specific axis, and a third constraint that sets a weight for a vertex of the initialization skeleton to zero if a joint is located beyond a threshold distance from the vertex.

18. The method of claim 17, wherein the set of constraints further comprises a constraint that a restricted pose space for a limb rotation is based on an anatomical constraint.

19. The method of claim 18, wherein the limb rotation comprises an arm that is restricted to not move through a digital character's torso.

20. The method of claim 17, wherein:
the set of constraints further comprises a constraint incorporating a segmentation set that relates a set of one or more initialization mesh vertices to a set of one or more joints of the initialization skeleton.

21. The method of claim 12, wherein the set of constraints comprises a non-rigid constraint.

* * * * *